(12) United States Patent
Wu et al.

(10) Patent No.: US 11,353,593 B2
(45) Date of Patent: Jun. 7, 2022

(54) IONOSPHERIC GRADIENT H1 MONITOR

(71) Applicant: Raytheon Company, Waltham, MA (US)

(72) Inventors: Shuwu Wu, Yorba Linda, CA (US); Nitin Kirit Pandya, Fullerton, CA (US)

(73) Assignee: Raytheon Company, Waltham, MA (US)

( * ) Notice: Subject to any disclaimer, the term of this patent is extended or adjusted under 35 U.S.C. 154(b) by 237 days.

(21) Appl. No.: 16/705,578

(22) Filed: Dec. 6, 2019

(65) Prior Publication Data

US 2021/0173090 A1  Jun. 10, 2021

(51) Int. Cl.
*G01S 19/07* (2010.01)
*G01S 19/05* (2010.01)
(Continued)

(52) U.S. Cl.
CPC ............ *G01S 19/074* (2019.08); *G01S 19/05* (2013.01); *G01S 19/072* (2019.08); *G01S 19/20* (2013.01); *G01S 19/41* (2013.01)

(58) Field of Classification Search
CPC ........ G01S 19/20; G01S 19/072; G01S 19/40; G01S 19/41; G01S 19/23; G01S 19/074
See application file for complete search history.

(56) References Cited

U.S. PATENT DOCUMENTS

| 7,768,451 | B2 * | 8/2010 | Wu | .................... | G01S 19/04 |
| | | | | | 342/357.23 |
| 8,898,011 | B2 * | 11/2014 | Peck | .................... | G01S 19/20 |
| | | | | | 701/469 |

(Continued)

FOREIGN PATENT DOCUMENTS

WO    WO-2016185500 A1 *  11/2016  ............. G01S 19/41

OTHER PUBLICATIONS

"Guide for Ground Based Augmentation System Implementation, Sections 3.3.6 and 3.5.2", International Civil Aviation Organization, Retrieved online: <https://www.icao.int/SAM/eDocuments/GBASGuide.pdf>, (May 2013), 31 pgs.

(Continued)

*Primary Examiner* — Gregory C. Issing
(74) *Attorney, Agent, or Firm* — Schwegman Lundberg & Woessner, P.A.

(57) ABSTRACT

Differential ranging measurements are formed using first ranging measurements from reference GNSS receivers and second ranging measurements from GNSS receivers on a rover, the first and second ranging measurements received from a plurality of GNSS satellites. A main navigation solution and a main protection level (PL) set are computed based on the differential ranging measurements. Ionospheric threat scenarios associated with experiencing severe ionospheric gradients to one or more of the plurality of GNSS satellites are determined. A supplemental navigation solution and a corresponding supplemental PL set for each of the plurality of ionospheric threat scenarios are computed. A maximum PL set is selected based on the main PL set and the supplemental PL sets to form a final PL set that protects the main solution against nominal navigation threats and severe ionospheric threats.

17 Claims, 6 Drawing Sheets

(51) Int. Cl.
  *G01S 19/20* (2010.01)
  *G01S 19/41* (2010.01)

(56) References Cited

U.S. PATENT DOCUMENTS

| | | | | |
|---|---|---|---|---|
| 9,576,082 | B2* | 2/2017 | Sparks | G06F 30/20 |
| 9,921,314 | B2* | 3/2018 | Jakel | G01S 19/071 |
| 10,649,093 | B2* | 5/2020 | Bartolone | G01S 19/20 |
| 2009/0150074 | A1* | 6/2009 | Vanderwerf | G01S 19/20 |
| | | | | 701/469 |
| 2016/0146942 | A1* | 5/2016 | McDonald | G01S 19/071 |
| | | | | 342/357.44 |
| 2019/0187295 | A1* | 6/2019 | Lee | G01S 19/074 |
| 2020/0348422 | A1* | 11/2020 | Carcanague | G01S 19/52 |

OTHER PUBLICATIONS

"International Application Serial No. PCT/US2020/053269, International Search Report dated Jan. 11, 2021", 5 pgs.

"International Application Serial No. PCT/US2020/053269, Written Opinion dated Jan. 11, 2021", 11 pgs.

Datta-Barua, Seebany, et al., "Ionospheric Threat Parameterization for Local Area Global-Positioning-System-Based Aircraft Landing Systems", Journal of Aircraft, vol. 47, No. 4, (Jul.-Aug. 2010), 1141-1151.

Jiwon, Seo, et al., "Targeted Parameter Inflation within Ground-Based Augmentation Systems to Minimize Anomalous Ionospheric impact", Journal of Aircraft, vol. 49, No. 2, (Mar. 1, 2012), 587-599.

Rippl, et al., "Real Time Advanced Receiver Autonomous Integrity Monitoring in DLR's Multi-Antenna GNSS Receiver", Navigation: Journal of The Institute of Navigation, (Feb. 1, 2012), 1767-1776.

Saito, Susumu, et al., "Ionospheric Delay Gradient Model for GBAS in the Asia-Pacific Region", GPS Solut, 21, (2017), 1937-1947.

Wu, Shuwu, et al., "Geometry Extra-Redundant Almost Fixed Solutions: A High Integrity Approach for Carrier Phase Ambiguity Resolution for High Accuracy Relative Navigation", IEEE/ION Plans, (May 2008), 568-582.

* cited by examiner

IONOSPHERIC GRADIENT H1 MONITOR

TECHNICAL FIELD

Some embodiments relate to the processing of geospatial positioning data. More specifically, some embodiments relate to an ionospheric gradient monitor and techniques to provide the bounding of navigation data against ionospheric threat scenarios.

BACKGROUND

The use of a Global Positioning System (GPS) or a Global Navigation Satellite System (GNSS) or multiple GNSS constellations combined for safety-critical, high-availability air navigation missions can be challenging due to the potential presence of undetected extreme ionospheric conditions. Examples of types of extreme ionospheric conditions include geomagnetic/ionospheric storms, auroral activity, and in equatorial or low latitude regions, Appleton anomalies, scintillations, ionospheric depletions, equatorial fountain, and sub-equatorial anomalies. These types of ionospheric conditions posed a severe challenge during the development of differential GPS navigation systems such as a Wide Area Augmentation System (WAAS) and a Local Area Augmentation System (LAAS). Without proper mitigation, these extreme ionospheric conditions pose threats to GPS-based navigation safety for both manned and unmanned aircraft since they can lead to erroneous range estimates due to mischaracterization of the ionosphere-induced differential signal delays between a reference system and a user.

The ionosphere is often the most significant factor constraining integrity and availability performance to safety-of-life GNSS-based navigation. While these extreme ionospheric conditions are rare, requirements for instantaneous high navigation integrity usually lead to very conservative assumptions of their potential presence even during benign ionospheric conditions. Without an effective detection or mitigation scheme, the need for safety-critical navigation leads to very conservative assumptions when performing high integrity calculations, leading to poor navigation service availability. Integrity refers to the reliability and trustworthiness of the information provided by the navigation system and to the system's ability to deliver timely warnings to users when the system should not be used for navigation because of signal corruption or some other error or failure in the system.

Existing solutions for mitigating severe ionospheric gradient threats in WAAS and LAAS do not meet the more stringent requirements for the sea-based automatic landing or for land-based CAT-III (or equivalent) automatic landing, both of which have very tight integrity alert limits (e.g., Vertical Alert Limit (VAL) of about 4.0 meters for automatic landing, VAL of 10 meters (at ½ Nautical Miles) for CAT-I Precision Approach (PA), 20 meters for APV-II, 35 meters for LPV200, and 50 meters for LPV/APV-I). Mitigating against severe ionospheric threats for automatic landing systems or for systems requiring high integrity Real-Time Kinematic (RTK) solutions remains a challenge. Without an effective solution, sea- or land-based CAT-I Precision Approach and automatic landing systems cannot achieve operationally required service availability while ensuring navigation safety.

BRIEF DESCRIPTION OF THE DRAWINGS

The present disclosure is illustrated by way of example and not limitation in the figures of the accompanying drawings, in which like references indicate similar elements and in which.

DESCRIPTION

Figure 1:
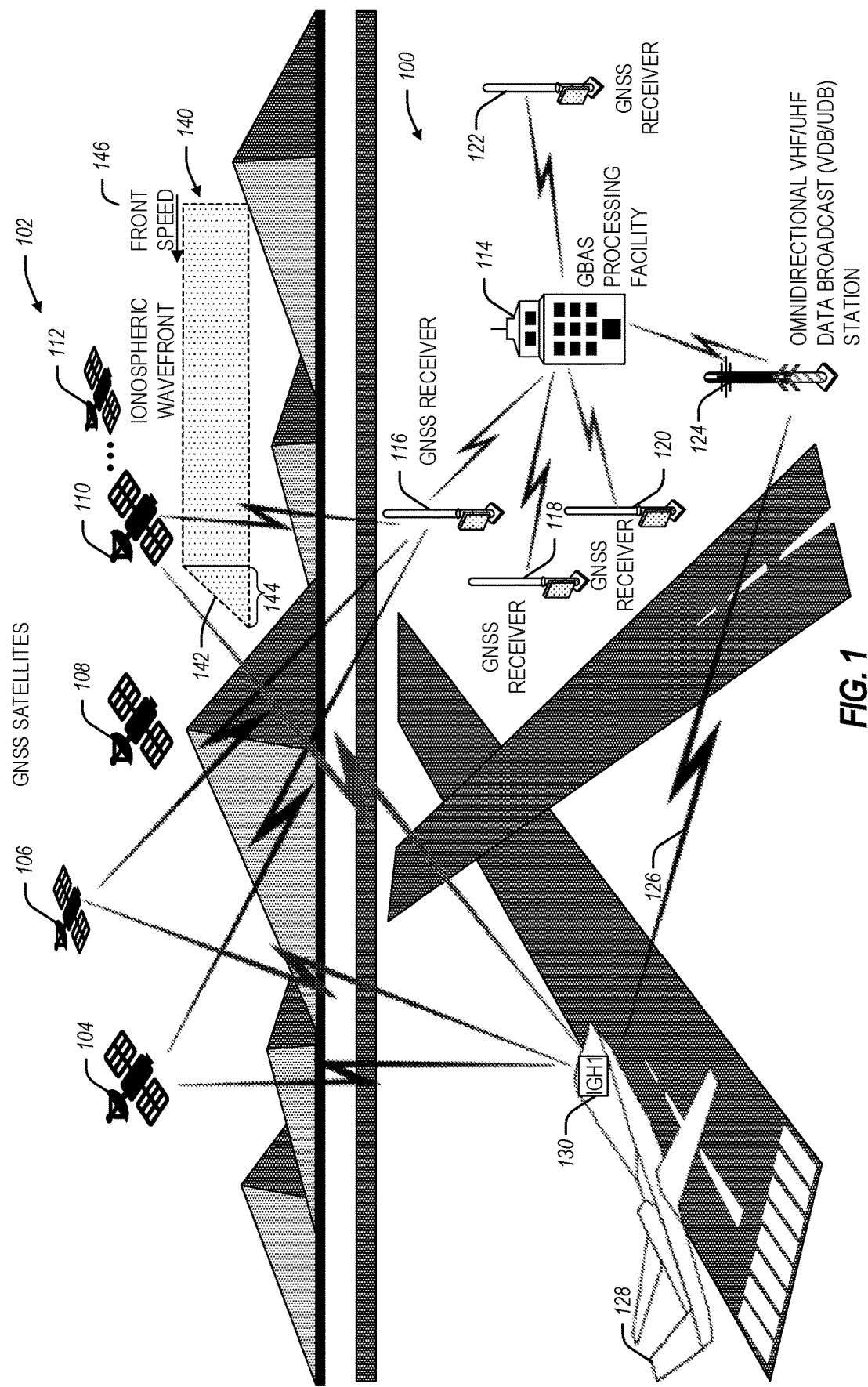
FIG. 1 illustrates processing of geo-spatial positioning data by an aircraft using an Ionospheric Gradient H1 (IGH1) Monitor within a Local Area Augmentation System (LAAS)/Ground Based Augmentation System (GBAS)/sea-based Precision Approach and Landing System, in accordance with some embodiments.

The following description and the drawings sufficiently illustrate specific embodiments to enable those skilled in the art to practice them. Other embodiments may incorporate structural, logical, electrical, process, and other changes. Portions and features of some embodiments may be included in or substituted for, those of other embodiments. Embodiments set forth in the claims encompass all available equivalents of those claims.

Natural occurrence of severe ionospheric gradients is rare (rarer than 1% of the time), except during an ionospheric storm or in equatorial regions commonly during the hours following sunset (i.e., the ionospheric depletion). A typical high integrity navigation system targets to achieve at least 99% to 99.5% service availability. At first glance, one might assume that the rarity of severe ionospheric gradient threats would not pose an issue to achieving 99% service availability. This is where high integrity requirements come into play. In a high integrity precision approach and automatic landing system, an ultra-low level of uncertainty, on the order of one in ten million per approach, must be ensured that the impact of an actual ionospheric gradient condition is fully and properly accounted for when computing a navigation solution and its integrity protection levels.

Given this stringent level of integrity requirement, conventional approaches necessarily make very conservative assumptions for the potential presence of severe ionospheric gradients, leading to an overly conservative representation of actual ionospheric conditions most of the time. In short, the challenge is to ensure on the order of "seven 9's" (or 99.99999%) level of certainty in threat mitigation while not severely degrading service availability.

Consider a sea- or land-based precision approach and automatic landing system. On one hand, for example, in order for a landing aircraft to catch the correct arresting wire on a carrier deck with a high success rate, it requires high accuracy in its navigation solution and small integrity alert limits. On the other hand, the system must ensure navigation safety. The following two conventional approaches are typically considered to ensure navigation safety.

In the first approach, a system takes advantage of dual-frequency GNSS signals and constructs "ionosphere-free" measurements (in which the ionospheric delay effect is essentially removed) to avoid ionospheric threats. This leads to a much less accurate navigation solution (which does not meet the sea-based automatic landing accuracy requirements) and much higher integrity protection levels (which does not meet sea-based automatic landing, land-based CAT-I precision approach or CAT-III landing integrity alert limits).

As used herein, the term "ionosphere-free" measurement is a specific linear combination of dual-frequency GNSS ranging measurements where an ionospheric delay is essentially removed. As used herein, the terms "CAT-I" and "CAT-III" are the ICAO/FAA Category I and Category III precision approach and landing operations, respectively, including CAT-III automatic landings. As used herein, the term "rover" indicates a nonstationary (and potentially moving) platform needing navigation guidance, such as an aircraft, a drone, a navigable missile/rocket, a ship, an automobile, a train, a shipping container, etc. As used herein, the term "protection level (PL) set" includes one or more PLs associated with a navigation solution, including a horizontal PL (HPL), a vertical PL (VPL), a lateral PL (LPL), and PLs for directions in a local navigation frame (e.g., North-East-Down frame). As used herein, the term "reference GNSS receivers" are on a stationary or mobile reference platform (e.g., a platform on ground/land, on a ship, on multiple ships, etc.) that provides reference GNSS ranging measurements to enable a rover to navigate relative to the reference platform. As used herein, the term "ranging measurement" indicates a GNSS pseudo-range or carrier phase measurement for a given frequency. As used herein, the term "ionospheric threat" (or "ionospheric threat scenario") indicates a threat to navigation safety when not properly accounting for potential ionospheric delay as a GNSS signal travels through ionosphere. As used herein, the term "severe ionospheric gradient" indicates non-nominal ionospheric conditions under which nominal ionospheric delay uncertainties cannot properly bound error in estimating ionospheric delays. As used herein, the term "severe ionospheric threat" indicates a threat to navigation safety associated with severe ionospheric gradients. As used herein, the term "feasible ionospheric threat" indicates a physically feasible severe ionospheric threat that can happen with a non-negligible probability for high integrity GNSS navigation. As used herein, the term "solution separation" indicates the 3D positional separation between the main navigation and supplemental navigation solutions. As used herein, the term "nominal navigation threat" indicates nominally operating GNSS sensors and ephemeris errors and nominal ionospheric conditions under which nominal ionospheric delay uncertainties, used when calculating the main navigation solution, can properly bound error in estimating ionospheric delays. As used herein, the term "nominal ionospheric delay" indicates ionospheric delay experienced by a GNSS signal during presence of nominal ionospheric gradients. As used herein, the term "post-adjusted differential ranging measurements" indicates adjusted differential ranging measurements to account for impact of severe ionospheric gradients treated as a delay bias.

In the first approach, one uses ionosphere-free ranging measurements for all the ranging sources to determine all the differential ranging measurements. When using an ionosphere-free ranging measurement, the cancellation of the ionospheric delay is obtained at the cost of a much noisier ranging measurement (~4.2 times larger than a noise-wise more optimal, Narrow Lane combination), resulting in a carrier-smoothed ranging measurement noise on the order of ~40-60 cm under nominal conditions for the measurement. Using ionosphere-free ranging measurements from all the satellites simultaneously does protect against the ionospheric threat but it provides neither sufficient accuracy to fix the carrier ambiguities nor small enough Protection Levels (PLs) to frequently meet Alert Limits (ALs) of ~4 meters during automatic landing operations. This can be seen since the typical GPS user/constellation geometry gives Vertical Dilution of Precision (or VDOPs) of ~2, and with $k_{HMI}$~5.33, the standard rough approximation estimate of Vertical Protection Level (VPL), using $VPL \approx k_{HMI} * VDOP * \sigma_{meas}$, gives values typically larger than 4 meters, resulting in much less than the desired 99.5% availability or more.

In the second approach, one must assume a much higher ionospheric gradient measurement/detection uncertainty when using "divergence-free" smoothed pseudo-range (PR) measurements to ensure less than one in ten million chance of being wrong. This may add up to 1 meter differential ionospheric error at 3 km from touchdown, which renders high integrity RTK solution impossible and lowers navigation solution accuracy (does not meet sea-based automatic landing accuracy requirement) and leads to much higher integrity protection levels (typically does not meet sea-based automatic landing or CAT-III integrity alert limits).

Therefore, neither of these conventional approaches can ensure navigation safety to the required integrity risk probability while providing high service availability. To further clarify, in the context of the second approach above, one computes a navigation solution under the assumption of GNSS sensor data, satellite orbital data, and ionospheric conditions all being nominal. This is described herein as the H0 navigation solution or a "main" navigation solution $x_{H0}$. In some embodiments, the main navigation solution and its associated Protection Level (PL) set are computed using the available measurements and their associated nominal uncertainties for all error sources.

A typical example of the main navigation solution computation for differential GPS (using GPS as the example GNSS) under nominal conditions (including nominal ionospheric conditions) is the following: The dual/triple frequency carrier phase and code (pseudorange) GPS signal "ranging measurements" and associated "ranging measurements error" safety bounds from a set of reference receivers are broadcast to a rover with GPS receivers. The broadcast reference pseudorange measurements are typically divergence-free carrier-smoothed (which uses dual/triple frequency carrier measurements to smooth pseudorange measurements in an ionosphere divergence-free manner but still includes the effect of ionospheric delay). The rover uses the broadcast reference data and its own rover receivers' ranging measurements and associated measurement error safety bounds to construct its set of "differential ranging measurements" and associated "differential ranging measurements error" safety bounds. Typical examples of "differential ranging measurements" constructible are taking the differences between rover and reference ranging measurements to the same satellites as "Single Difference" (SD) measurements, or after doing so, secondly taking the differences between one of the SD measurements to all of the other SD measurements to obtain "Double Difference" (DD) measurements (thereby removing almost all receiver and satellite clock biases and other common-mode signal-in-space errors). Ranging measurement differences between a rover and reference to the same satellites could be impacted by ionospheric gradients, nominal or severe, so the associated "differential ranging measurements error" estimates model needs to be constructed to safely bound the associated ionospheric gradient uncertainty levels.

If measurements (or other means) are used to estimate the ionospheric gradients and correct for their effects by adjusting differential ranging measurements, the associated differential ranging measurements error estimate model needs to be constructed to safely bound the residual ionospheric gradient uncertainty levels from the ionospheric delay corrections. The "safety bound" against ionospheric gradient threats is usually determined by safety bounding performance against "ionospheric threat models" or empirical observation data. The potential ionospheric gradient profile configurations and behavior that characterize the space of potential ionospheric threats that need to be bounded to generally accepted integrity levels is described in, for example, the following publications: Datta-Barua, et al. (2010; "Ionospheric Threat Parameterization for Local Area Global-Positioning-System-Based Aircraft Landing Systems," AIAA Journal of Aircraft, Vol. 47, No. 4) and Saito, et al. (2017; "Ionospheric Delay Gradient Model for GBAS in the Asia-Pacific Region," GPS Solut, DOI: 10.1007/s10291-017-0662-1). These publications characterize the current state of the LAAS/GBAS ionospheric threat integrity problem that disclosed techniques mitigate efficiently.

The full range of ionospheric threats could be characterized as "nominal" or "severe" (non-nominal). Techniques discussed herein associated with the disclosed IGH1 Monitor allow the main navigation solution to be computed to safely bound the "nominal" ionospheric threats and adds navigation safety protection against the "severe" ionospheric threats to the main navigation solution. The ionospheric gradient threat safety bounds are combined with the safety bounds for other error sources (e.g., differential tropospheric and ephemeris errors, receiver noise, multipath, antenna bias, etc.) to safely account for all differential ranging measurements errors. The differential ranging measurements and their associated error bounds, and the satellite line-of-sight geometries are used to compute the main navigation solution (the relative position vector between the rover and the reference system) and to compute the main navigation solution associated protection level (PL) set.

The main navigation solution and its PL set can be a carrier-smoothed-code (or float) solution, or a high integrity RTK solution such as Geometry Extra-Redundant Almost Fixed Solution (GERAFS), or potentially other solutions. A carrier-smoothed-code or float solution is a weighted least squares solution using carrier-smoothed differential pseudorange measurements. A high integrity RTK, such as GERAFS, resolves carrier phase integer cycle ambiguities and then calculates navigation solution based on ambiguity-resolved, much cleaner carrier phase measurements, yielding centimeter-level accuracy in real-time. GERAFS is a pioneering technique in accounting for needed increase in protection levels when integer ambiguities are not resolved correct (a rare but non-negligible condition). A discussion of the carrier-smoothed-code solution, float solution, and GERAFS solution is provided in the following publications: S.

Wu, S. R. Peck, R. M. Fries, G. A. McGraw, "Geometry Extra-Redundant Almost Fixed Solutions: A High Integrity Approach for Carrier Phase Ambiguity Resolution for High Accuracy Relative Navigation," IEEE/ION PLANS, May 2008 and U.S. Pat. No. 7,768,451 (issued Aug. 3, 2010).

As used herein, the term "H0 navigation solution" indicates the main navigation solution that can be calculated for a rover and protected by a PL set. As used herein, the term "H1 solution" (or "H1 navigation solution" such as an H1 solution technique used to address the erroneous ephemeris threat in U.S. Pat. No. 8,898,011 (issued Nov. 25, 2014)) indicates a supplemental navigation solution which may be calculated by an ionospheric gradient H1 monitor (IGH1 Monitor) disclosed herein, under one or more ionospheric threat scenarios. Techniques discussed herein can be used to configure an H1 monitor for ionospheric gradient threats, treating each threat scenario as a single fault event, allowing efficient bounding over all ionospheric threat scenarios simultaneously in order to meet integrity requirements. The IGH1 Monitor discussed herein resolves the conflicting needs between achieving high accuracy/availability performance and maintaining navigation safety/integrity against ionospheric gradient threats that were unaddressed by prior approaches. It supports sea-based Precision Approach and Landing Systems operational needs, civil CAT-I and CAT-III PA/Landing requirements, sea- and land-based unmanned aerial vehicles (UAV) automatic landing requirements, and land-based regional service coverage up to a radius of 20 nautical miles (NM), which allows support of multiple landing locations.

Techniques discussed herein extend the concept of H1 monitoring to ionospheric threat monitoring (e.g., using the IGH1 Monitor) to achieve integrity, including covering extreme ionospheric scenarios (e.g., forming a PL set that protects a main navigation solution against nominal threats as well as severe ionospheric threats). In some embodiments, a high integrity and accuracy navigation solution is achieved using the disclosed IGH1 Monitor for meeting stringent performance requirements (up to UAV automatic landing) while simultaneously maintaining navigation safety against ionospheric threats. The discussed IGH1 Monitor can operate in conjunction with per satellite ionospheric gradient detectors to maintain full integrity against ionospheric threats.

FIG. 1 illustrates the processing of geospatial positioning data by an aircraft using an Ionospheric Gradient H1 Monitor (IGH1 Monitor) within a Local Area Augmentation System (LAAS)/Ground Based Augmentation System (GBAS)/sea-based Precision Approach and Landing System, in accordance with some embodiments. Referring to FIG. 1, the GBAS 100 includes a plurality of reference receivers 116-122, which may be located in an area around an airport and are configured to receive geospatial positioning data from GNSS satellites 102, including satellites 104, 106, 108, 110, . . . , 112 configured to generate geospatial positioning data.

The reference receivers 116-122 send measurements to a processing facility 114, which uses these measurements to formulate differential corrections and error bounds for the GNSS satellites 102 that are tracked by the reference receivers 116-122. Each of the reference receivers 116-122 is precisely surveyed, enabling the processing facility 114 to determine errors in geospatial positioning signals being received from the GNSS satellites 102 by the reference receivers 116-122. Satellite and receiver measurements are monitored for potential faults, and measurements with detected faults are removed from the differential corrections.

The GBAS processing facility 114 transmits these differential corrections, error bounds, ranging measurements, and other approach guidance information to a rover, such as an aircraft 128, via a VHF Data Broadcast (VDB) or UHF Data Broadcast (UDB) 126 transmitted by VDB/UDB station 124.

The aircraft 128 includes an IGH1 Monitor 130, which comprises suitable circuitry, interfaces, and/or code and is configured to use data from the GNSS satellites 102 as well as the VDB/UDB 126 from the VDB/UDB station 124 to perform one or more of the techniques discussed herein for maintaining integrity and protecting a main navigation solution ($x_{H0}$) against ionospheric threats, such as the ionospheric gradient front 140. The ionospheric gradient front 140 can be modeled as a linear semi-infinite wedge with a slope 142, width 144, and front speed 146. As illustrated in FIG. 1, the ionospheric gradient front 140 can affect the measurements transmitted by multiple satellites, such as satellites 110, . . . , 112. The ionospheric gradient front 140 can affect the GNSS satellite signals by delaying the propagation of the modulation (e.g., group delay) and, in some regions, by causing rapid fluctuations in the power and phase of the received signal (e.g., scintillation effects).

Under hypothesis, severe ionospheric gradients, when present, can only simultaneously affect a subset (N) of the total (M) satellites 102 in view (in some aspects, the maximum number of simultaneously impacted satellites is, for example, N=2, established by expert consensus). Therefore, it could be assumed that no more than N=2 or 3 of the satellites 102 in view are impacted simultaneously by an extreme gradient front such as the ionospheric gradient front 140. For the remaining satellites, nominal ionospheric conditions could be assumed. This assumption is particularly applicable when the aircraft 128 is landing with reference GNSS receivers that are close to, e.g., less than 3 km away from, a touchdown point.

In some embodiments, using the IGH1 Monitor 130 in connection with the techniques discussed herein provides a high integrity RTK solution or a divergence-free carrier-smoothed-code (float) solution without overly conservative ionospheric gradient uncertainty for the main navigation solution. This ensures high or sufficient accuracy for navigation purposes like catching the correct wire on an aircraft carrier or automatic landing on a fixed runway. The IGH1 Monitor 130, however, also provides high integrity against severe ionospheric gradient threats for the main navigation solution.

Figure 2:
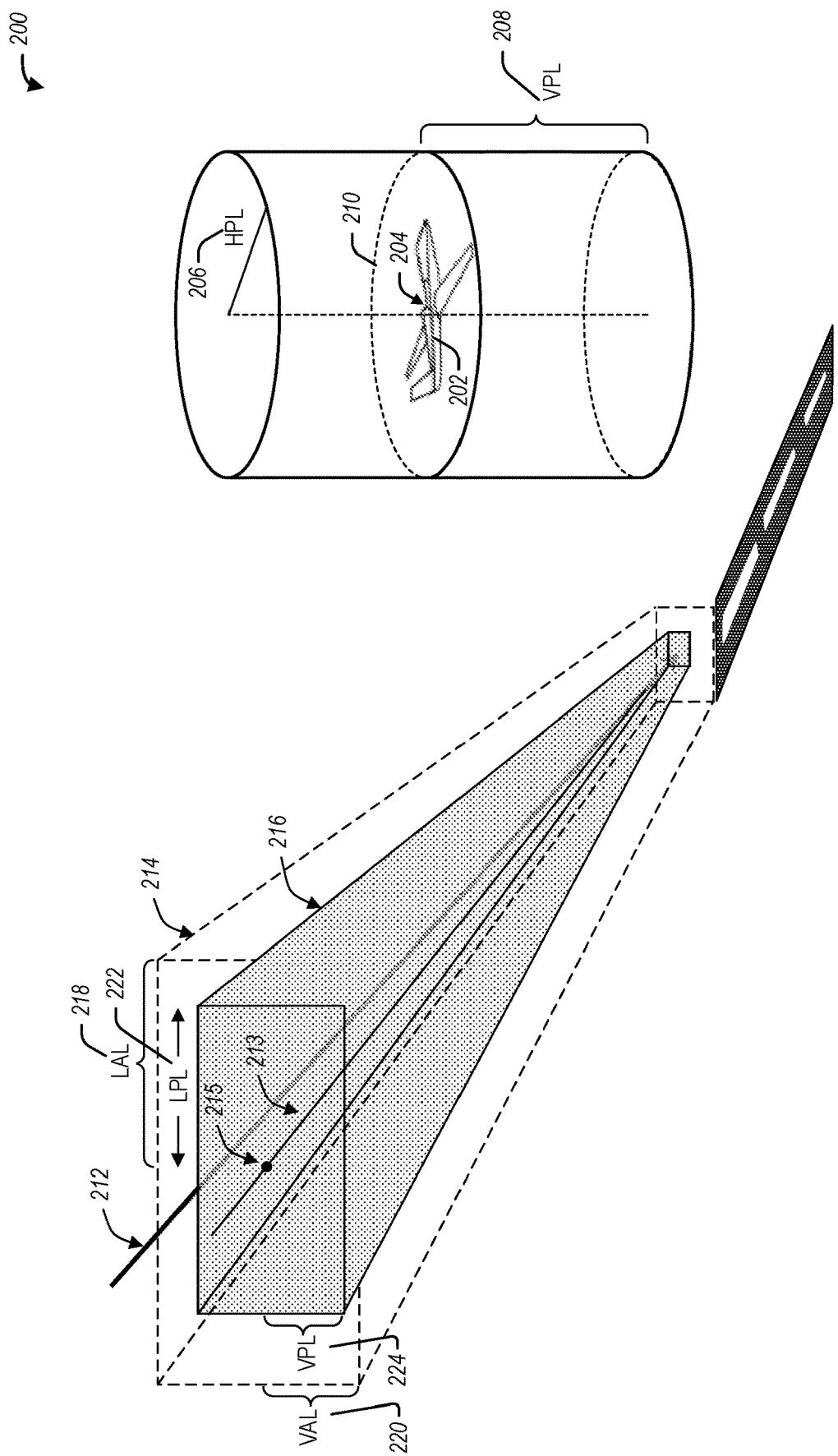
FIG. 2 illustrates example protection levels that can be part of a protection level (PL) set, including a horizontal protection level (HPL), a vertical protection level (VPL), and a lateral protection level (LPL), which can be used in connection with forming a final PL set that protects a main navigation solution, in accordance with some embodiments.

In some embodiments and as discussed herein, different protection levels (PLs) may be calculated as part of one or more PL sets in connection with maintaining the integrity and protecting the main navigation solution $x_{H0}$. FIG. 2 illustrates a diagram 200 of example protection levels that can be part of a protection level (PL) set, including a horizontal protection level (HPL), a vertical protection level (VPL), and a lateral protection level (LPL), which can be used in connection with forming a final PL set that protects a main navigation solution, in accordance with some embodiments. Referring to FIG. 2, aircraft 202 may have a desired position 204 on an ideal approach path. As used herein, the term "horizontal protection level" (or HPL) is the radius 206 of a circle in a horizontal plane 210 with its center being on the desired position 204, which describes the region that is assumed to contain an indicated horizontal position of the aircraft 202. As used herein, the term "vertical protection level" (or VPL) 208 is half the length of a segment on the vertical axis (perpendicular to the horizontal plane 210), with its center being at the true position 204. The VPL 208 describes the region that is assumed to contain an indicated vertical position of the aircraft 202.

FIG. 2 further illustrates an alert limit tunnel 214 and a protection level tunnel 216 with a defined path 212 (e.g., a defined path for an aircraft to follow until touch-down). The alert limit tunnel is associated with a lateral alert limit (LAL) 218 and a vertical alert limit (VAL) 220. The alert limit associated with the horizontal direction is a horizontal alert limit (HAL). The protection level tunnel 216 is also associated with an LPL 222 and a VPL 224, as illustrated in FIG. 2. An LPL is defined as the integrity bound in the lateral direction (on the horizontal plane and perpendicular to the defined path 212). In aspects associated with precision approach and landing, a PL set can include the VPL and the LPL. In aspects associated with en-route navigation, a PL set can include the HPL. The PL box defines a region within which an aircraft is truly contained, with a high level of certainty, for example, seven 9's probability.

In some embodiments, the IGH1 Monitor 130 considers all feasible scenarios of N satellites of M total satellites that could be simultaneously impacted by severe ionospheric gradients and are needed to protect the required integrity level against the ionospheric threats (e.g., the ionospheric gradient front 140). Put another way, the IGH1 Monitor 130 considers a plurality of ionospheric threat scenarios that satisfy a pre-defined integrity requirement and allocation (e.g., for each of the plurality of threat scenarios up to 2 satellites are impacted by the ionospheric threat or other integrity requirements).

In some embodiments, the following five options may be used by the IGH1 Monitor 130 for protecting the integrity of the main navigation solution:

Option 0. In some embodiments, the IGH1 Monitor 130 may discard and not use any of the measurements associated with the satellites that are impacted by the ionospheric gradients.

Option 1. In an example embodiment, for each ionospheric hypothesized gradient threat scenario (defined by a specific subset of N-impacted satellites), the IGH1 Monitor 130 computes a supplemental navigation solution (e.g., a float or a Carrier-Smoothed-Code solution), referred to as the ionospheric H1 navigation solution, and its integrity protection levels (referred to as ionospheric H1 protection level set), by using nominal and conservatively safe ionospheric gradient uncertainties (bound to the required integrity risk allocation levels) for unimpacted and impacted satellites, respectively. Consequently, each combination's H1 navigation solution PLs adequately protects the associated H1 navigation solution for the given hypothesized threat scenario. Accounting for the solution separation between the H1 navigation solution and the main navigation solution $x_{H0}$ to the H1 navigation solution PLs, an individual ionospheric gradient H1 PL set is obtained (e.g., VPL, HPL, and/or Lateral PL) that protects the main navigation solution $x_{H0}$ for the specific hypothesized threat scenario. Taking the maximum of individual ionospheric gradient H1 PL sets over all feasible threat scenarios results in the maximum ionospheric gradient H1 PL set (or a maximum PL set). In this regard, the maximum PL set (e.g., a combination of VPL, LPL, and/or HPL) protects the main navigation solution $x_{H0}$ against severe ionospheric gradient threats up to the specified integrity risk allocation. When determining the maximum PL set over all feasible threat scenarios, each PL type in the PL set may be independently determined by taking a maximum value of such PL type over all the threat scenarios.

Option 2. In an example embodiment, the IGH1 Monitor 130 is configured to perform the same calculation as in Option 1, except that ionosphere-free measurements may be used for the N-impacted satellites for the purpose of the H1 integrity calculation (as opposed to using the conservatively safe ionospheric gradient uncertainties in Option 1). This option has the advantage that it protects against any level of severe ionospheric gradients, including levels that may have never been observed. Example processing functionalities performed by the IGH1 Monitor 130 in connection with Options 1 and 2 are further discussed in connection with FIG. 3.

Option 3. In an example embodiment, as another alternative, the IGH1 Monitor 130 is configured to perform the same calculation as in Option 1, except that: (1) the IGH1 Monitor 130 uses nominal or inflated ionospheric gradient uncertainties for the N-impacted satellites; and (2) the IGH1 Monitor 130 also accounts for the possible combinations of ranging measurement biases experienced by the N-impacted satellites of the hypothesized scenario in the H1 integrity calculation. This option provides an alternative integrity bounding calculation by treating ranging biases as biases, instead of only employing the sigma overbounding technique as in Option 1. Example processing functionalities performed by the IGH1 Monitor 130 in connection with Option 3 are further discussed in connection with FIG. 4.

Option 4. In yet another example embodiment, the IGH1 Monitor 130 is configured to perform the same calculation as in Option 1, except that for each of N impacted satellites, one or more of the following options may be selected: (1) the IGH1 Monitor 130 excludes the differential ranging measurements; (2) the IGH1 Monitor 130 uses nominal, inflated, or safe ionospheric gradient uncertainties for impacted satellites; (3) the IGH1 Monitor 130 accounts for the possible combinations of ranging measurement biases; and (4) the IGH1 Monitor 130 uses ionosphere-free measurements. This implementation yields any possible combination of optional treatments for N impacted satellites. In this regard, for the N impacted satellites, processing of measurements from such satellites may be partitioned into any combination of the above-listed Option 0, Option 1, Option 2, and Option 3. For example, Option 0 may be associated with removing measurements from n0 number of the N impacted satellites; Option 1 may be associated with inflating unbiased measurements from n1 of the N impacted satellites; Option 2 may be associated with using ionosphere-free measurements from n2 number of satellites out of the N impacted satellites; and Option 3 may be associated with using biased and possibly inflating measurements from n3 number of satellites of the N impacted satellites. Therefore, for Option 4, Options 0-3 can be used in any combination so that measurements from a total of N=n0+n1+n2+n3 impacted satellites are considered in any combination (where ni can be 0 for unexercised options). Additionally, the biases and inflations used herein may cover any non-nominal inflation or non-zero bias, if used.

Option 5. In another more general example embodiment, the IGH1 Monitor 130 is configured to perform multiple and different variants of Option 4 computations, in a logical structure with various logic branches, to determine the total ionospheric gradient PL set that protects the main navigation solution $x_{H0}$ against severe ionospheric gradient threats up to the specified integrity risk allocation. Option 4 variants are specified by their N and $\{ni\} \equiv \{n0, n1, n2, n3\}$ set and their selected parameters (such as those for non-nominal inflation or non-zero bias, if needed). Note that Options 0, 1, 2, and 3 are specific variants of Option 4. Option 5 is IGH1 Monitor 130 configured to use logical structures selected for the application and meeting integrity that use Option 4 variants in its logic branches, each branch variant specified by its N and $\{ni\} \equiv \{n0, n1, n2, n3\}$ set and its selected parameters. Note that the logical structure (e.g., AND and OR or more intricate logics) could use different N's for different logic branches, as well as different $\{ni\}$ sets and different selected parameters. The computations for the total ionospheric gradient H1 PL set for Option 5, using the maximum H1 PL sets from each logic branch, depend on the particular logical structure used. The "final PL set" is determined by taking the maximum of the H0 Pl set (i.e. "main PL set") and the total ionospheric gradient H1 PL set, so the "final PL set" cannot be less than the "main PL set".

The IGH1 Monitor 130 is configured to use any of the above options based on, e.g., an assessment of the optimal choice given a specific application and its requirements. In some embodiments, the IGH1 Monitor 130 is configured to switch between any of the above-listed options in order to determine the optimal protection levels for the main navigation solution based on the aircraft approach geometry.

In some embodiments, integrity allocation and justification of the IGH1 Monitor 130 against severe ionospheric gradient threats can be configured as follows:

No more than up to N satellites in view can be simultaneously impacted by severe ionospheric gradients such as the ionospheric gradient front 140 (e.g., N=2). The case for this assertion is even stronger in the sea-based Precision Approach and Landing System due to the fact that the integrity threat can only materialize when a severe ionospheric gradient front moves within a narrow range of velocities and simultaneously within a narrow range of positions relative to ship and aircraft locations. Additionally, the ionospheric gradient H1 PLs as calculated above provide integrity protection of the main navigation solution $x_{H0}$ to an allocated integrity level. The IGH1 Monitor part of integrity relies on the conventional Gaussian overbound methodology and is justified analytically, and therefore does not require additional numerical/empirical analyses or Monte-Carlo simulations than those possibly needed to determine the safety bounds for "nominal" and "severe" ionospheric gradients for each satellite (such as using an ionospheric threat model).

The integrity allocation for the IGH1 Monitor 130 can be configured as follows, using the following integrity parameters:

PHMIiono is the allocated probability for hazardous and misleading information due to ionospheric gradient threats (e.g., on the order of $10^{-8}$). Pgradient is apriori probability of the existence of non-nominal ionospheric gradient conditions (slightly less than $10^{-2}$). Piono_H1_PL_underbound is the probability of ionospheric gradient PLs fail to bound actual error of an H1 navigation solution. In the above definitions, PHMIiono=Pgradient*(Piono_H1_PL_underbound+Piono_uncertainty_underbound), where: Piono_H1_PL_underbound is the probability used to compute the uncertainty inflation k-factor used in protection level calculations for the individual H1 navigation solutions, and Piono_uncertainty_underbound accounts for the probability of extremely rare conditions under which the ionospheric gradient is extremely severe and even the safety ionospheric uncertainties fail to bound ionospheric error. In some embodiments, Piono_H1_PL_underbound and Piono_uncertainty_underbound are on the order of $10^{-6}$.

Figure 3:
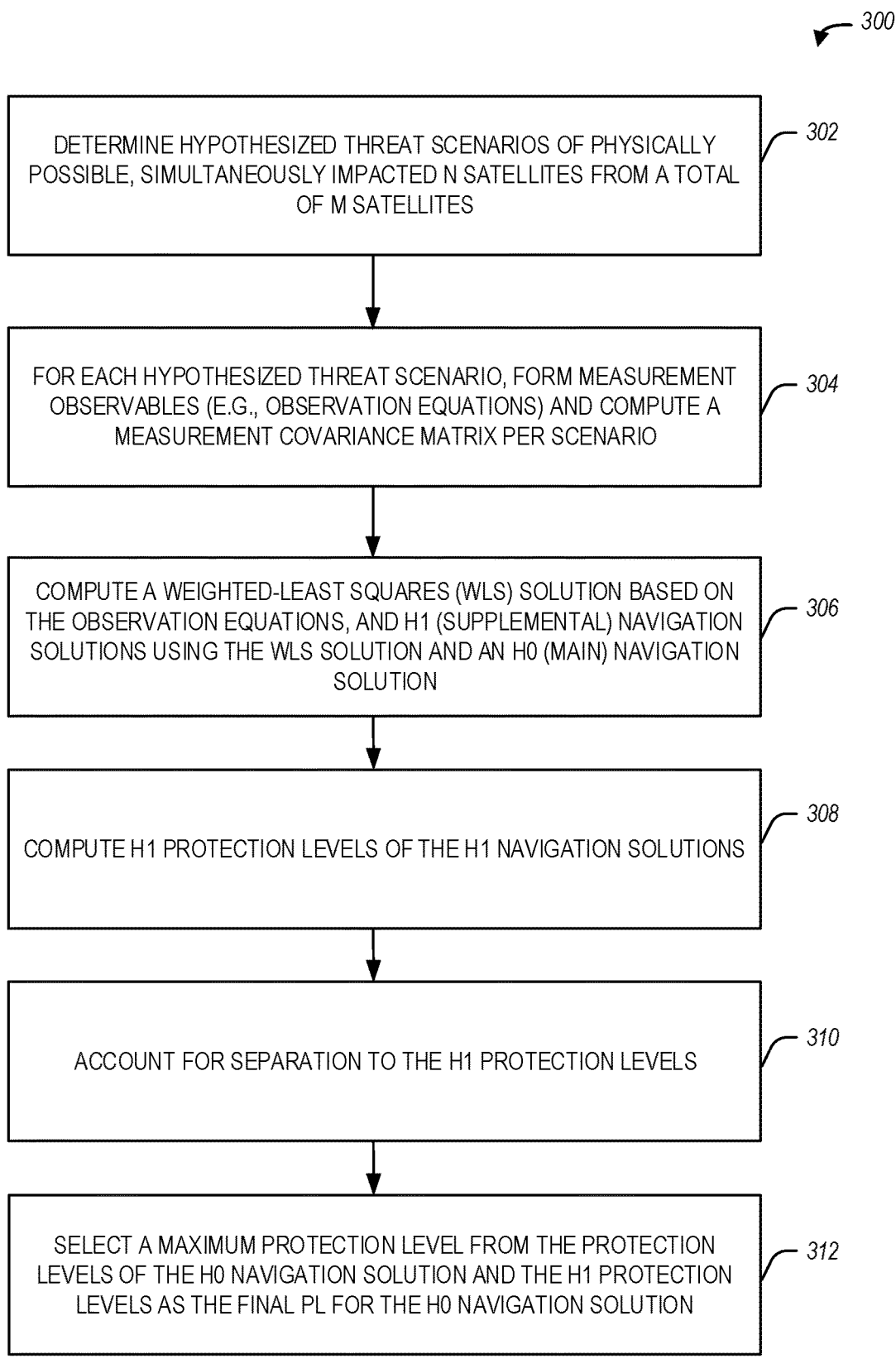
FIG. 3 illustrates a flowchart of a method for calculating a supplemental (H1) navigation solution with corresponding protection levels, in accordance with some embodiments.
Figure 4:
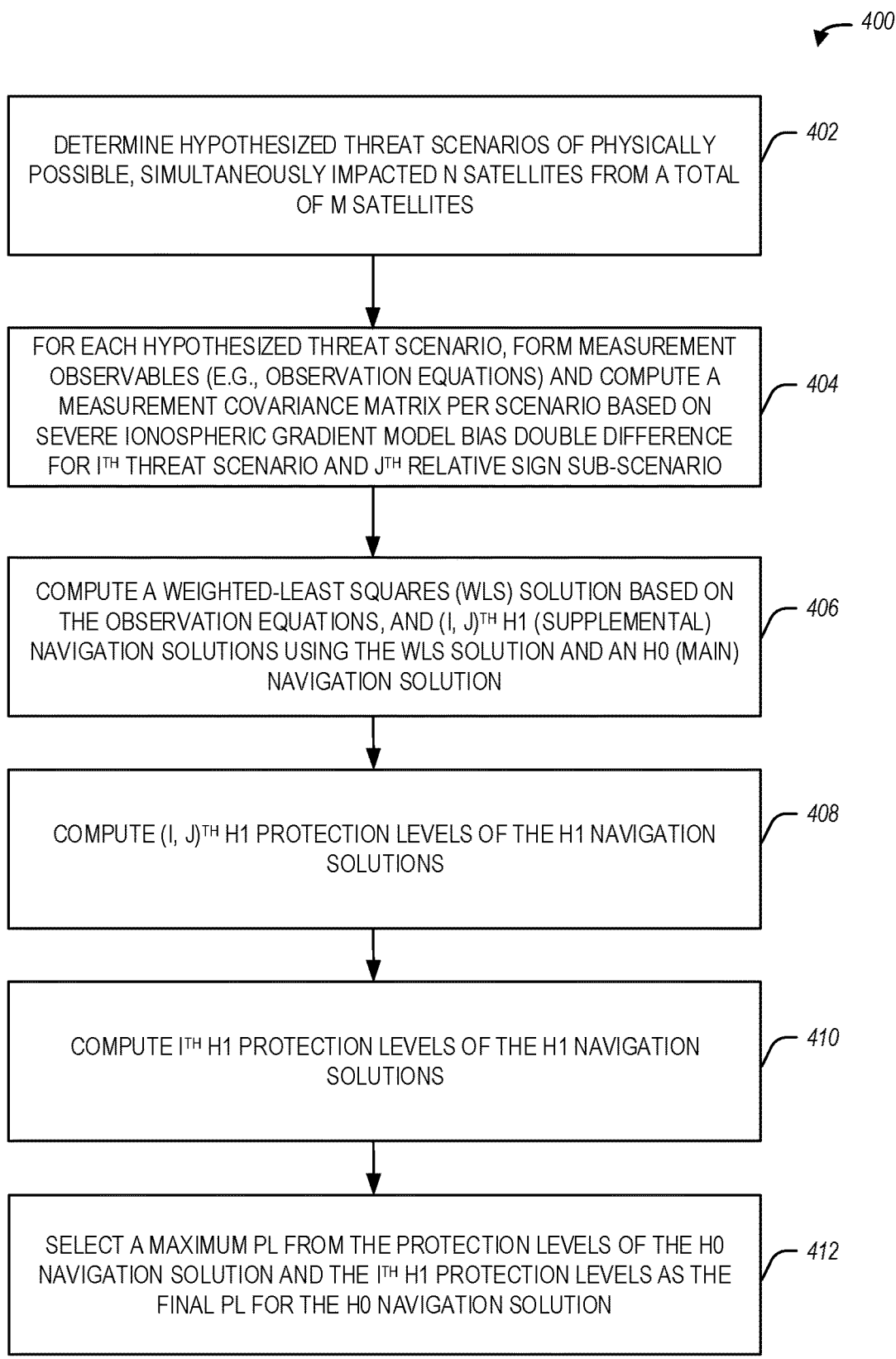
FIG. 4 illustrates a flowchart of another method for calculating a supplemental (H1) navigation solution with corresponding protection levels, in accordance with some embodiments.

In some embodiments, the following processing functionalities can be performed by the IGH1 Monitor 130 in connection with Options 0, 1, 2, 3, 4, and 5 mentioned above. The mathematical formulations for the Options 0, 1, 2, and 3 are essentially the same, with Options 0, 1, and 2 being very similar and a slightly different formulation being used for Option 3. The mathematical formulation for Options 1 and 2 are described below in connection with FIG. 3, and then related to Option 0. This is subsequently followed by description of the mathematical formulation for Option 3 as illustrated in FIG. 4. Then, the formulation of Option 4 as a generalization using potential combinations of operations related to Options 0, 1, 2, and 3 is expanded upon (and how these options are specific variants of Option 4). This is followed by expansion on how Option 5 is a generalization that utilizes multiple variants of Option 4 in branches of logical structures, with some examples.

Although Options 1 and 2 are very similar, they are different based on the differences of measurements and uncertainties used for the satellites experiencing severe ionospheric gradients: Option 1 uses conservatively safe ionospheric gradient uncertainties and Option 2 uses ionosphere-free measurements with negligible ionospheric gradient uncertainties but with the higher measurement error uncertainties associated with the ionosphere-free measurement combination. Once this difference in computation of measurement combination and error covariance is addressed, the subsequent mathematical formulation (e.g., as illustrated in FIG. 3) for both options is the same. The airborne procedure for performing Ionospheric Gradient H1 Monitor Options 1 and 2 is as discussed in connection with FIG. 3.

FIG. 3 illustrates a flowchart of a method 300 for calculating a supplemental (H1) navigation solution with corresponding protection levels, in accordance with some embodiments. The method 300 includes operations 302-312, which may be performed by the IGH1 Monitor 130 (which can be the same as the device 600 of FIG. 6).

At operation 302, the IGH1 Monitor 130 is configured to determine all hypothesized threat scenarios of feasible, simultaneously impacted N-satellites from a total of M satellites. At operation 304, for each hypothesized threat scenario, measurement observables (e.g., an observation equation) are formed and the measurement covariance matrix per chosen option (scenario) is computed. In an embodiment, a Carrier-Smoothed-Code solution can be used in connection with Option 1. The observation equation is given as $DD_{res,i}=G*\delta x_{H1,i}+\varepsilon_{DD,i}$, where: i is the index for the $i^{th}$ threat combination; $DD_{res,i}$ is the Double-Difference of measurement observables residual linearized at $x_0$, an initial position estimate (e.g., one can use the main navigation solution from H0, i.e., use $x_0=x_{H0}$), for the $i^{th}$ threat combination; G is the observation matrix; $\delta_{H1,i}$ is the position correction to be computed; and $\varepsilon_{DD,i}$ is the Double-Difference observable error. Although we use DD measurements as an example for implementing the various options, the implementation of this invention is not restricted to DD-based mathematical formulation. Other choices, such as SD-based formulation, are available.

At operation 306, a Weighted-Least Squares (WLS) solution is computed based on the observation equation and the supplemental (H1) solution, as $\delta x_{H1,i}=(G^TWG)^{-1}*G^T*W*DD_{res,i}$, where W is the inverse matrix of the variance-covariance matrix of Double-Difference residuals. Then the $i^{th}$ H1 navigation solution, $x_{H1,i}$, is computed as $x_{H1,i}=x_0+\delta x_{H1,i}$.

At operation 308, the $i^{th}$ H1 navigation solution PLs are computed as, using VPL as an example, $VPL_{H1\_sol\_i}=k_{iono\_H1}*\sigma_{vert,H1,i}$, where $k_{iono\_H1}$ factor corresponds to Piono_H1_PL_underbound to account for the stochastic probability of under-bounding; and $\sigma_{vert,H1,i}$ is the vertical position solution uncertainty for the $i^{th}$ ionospheric H1 navigation solution. In some embodiments, differential GPS techniques can be used for Weighted Least Squares (WLS) computations of vertical position solution uncertainty, which is the square root of a diagonal element of the position solution covariance matrix, i.e., element (3, 3) that corresponds to the vertical position solution uncertainty.

At operation 310, separation between each H1 navigation solution and the main navigation solution $x_{H0}$ is accounted for in the H1 navigation solution protection levels to form ionospheric H1 protection levels. More specifically, the $i^{th}$ ionospheric gradient H1 PLs are computed as, again using VPL as an example, $VPL_{H1,i}=|(x_{H1,i}-x_{H0})_{vert}|+k_{iono\_H1}*\sigma_{vert,H1,i}$, where $x_{H1,i}$ and $x_{H0}$ are the $i^{th}$ H1 and main navigation solutions, respectively. The maximum of all the $i^{th}$ ionospheric gradient H1 PLs is selected over all hypothesized threat scenarios to obtain the ionospheric gradient H1 PLs as, again using VPL as an example, $$VPL_{H1,iono} = \max_{i}\{VPL_{H1,i}\}.$$

At operation 312, a maximum PL is selected from the PLs of the H0 navigation solution and the H1 PLs as the final PL for the H0 navigation solution. For example, the maximum of the ionospheric gradient H0 PLs and the ionospheric gradient H1 PLs is selected as, again using VPL as an example, $VPL_{H0\&H1,iono}=\max(VPL_{H0},VPL_{H1,iono})$.

The resulting PL set protects the main navigation solution $x_{H0}$ against threats under nominal conditions and threats associated with both nominal and severe ionospheric gradients. In some embodiment, to provide full integrity against all threats (nominal or otherwise), the final overall VPL, for example, can be selected as the maximum of $VPL_{H0\&H1,iono}$ and the other H1 VPLs, such as H1 receiver and H1 ephemeris VPLs, etc.

In the above techniques, the main navigation solution $x_{H0}$ can be computed using the nominal Differential Ionospheric Correction (DIC) sigma DICs ($\sigma_{DIC,\ j,H0}$'s), which may increase the probability of obtaining a fixed (or almost fixed) solution that provides high accuracy. Note that DICs are the differential corrections between aircraft and reference measurements based on estimated differential ionospheric delays, and sigma DICs are the uncertainties associated with differential ionospheric delay estimates. Since when calculating the H1 navigation solution VPL, $VPL_{H1,iono}$, one takes credit for the apriori probability of the existence of non-nominal (severe) ionospheric gradients and noting that satellite geometries are nominally good (with generally well-distributed measurement observations), the cost in increased H1 VPLs is generally insufficient to cause a loss of service. The "vulnerable" geometries (i.e., geometries with poor satellite coverage) may be impacted, but those are rare occurrences and hence have a minor impact on worldwide service availability averaged over a day. Therefore, the availability of navigation service is only slightly or rarely impacted based on functions performed by the IGH1 Monitor 130. The IGH1 Monitor 130 thus provides a practically efficient method to meet the strict provable integrity requirements against ionospheric gradient threats while simultaneously achieving high accuracy and high availability of navigation service for CAT I approach (with VAL of 10 meters) up to tens of nautical miles away from a reference platform and CAT III automatic landing (with VAL of ~4 meters).

Option 0 is very similar to Options 1 and 2. For the impacted satellites, instead of just using conservatively safe ionospheric gradient uncertainties as in Option 1 or using ionosphere-free differential ranging measurements as in Option 2, for Option 0 the observation equations are adjusted to remove the associated differential ranging measurements and associated matrix elements in the observation matrices and the variance-covariance matrices and inverse matrices. Alternatively, for Option 0, the contributions of the impacted satellites to the scenario solution could be de-weighted through extreme inflation of their associated measurement uncertainties (like an extreme case of Option 1). Other than that, the flow of steps for operations in Option 0 are the same those of Options 1 and 2 in FIG. 3.

In some embodiments, the IGH1 Monitor 130 is configured to perform processing in connection with Option 3 above, which may deviate from the previous options by explicitly accounting for the possible ranging measurement biases for the N-impacted satellites consistent with the hypothesized scenario. For example, IGH1 Monitor 130 can be configured to perform overbounding the possible biased distributions rather than overbounding only by inflation of the unbiased distribution variances. The possible ranging measurement biases for the N-impacted satellites for each scenario are determined by modeling ionospheric gradients consistent with the integrity bounding requirement that could have been experienced. These are then used for the H1 integrity computations as in the previous options (but with more sub-scenario combinations since biases are signed quantities in the range domain). Option 3 can use the range from nominal or inflated ionospheric gradient uncertainties for the N-impacted satellites.

The procedure for performing Option 3 processing by the IGH1 Monitor 130 is illustrated in FIG. 4 (the initial processing functions being the same as for Options 1 and 2). FIG. 4 illustrates a flowchart of another method 400 for calculating a supplemental (H1) navigation solution, in accordance with some embodiments. The method 400 includes operations 402-412, which may be performed by the IGH1 Monitor 130 (which can be the same as the device 600 of FIG. 6).

At operation 402, the IGH1 Monitor 130 is configured to determine all hypothesized threat scenarios of physically possible, simultaneously impacted N-satellites from a total of M satellites. At operation 404, for each hypothesized threat scenario, measurement observables (e.g., an observation equation) are formed and the measurement covariance matrix per chosen scenario is computed. Option 3 processing may use a Carrier-Smoothed-Code solution, without using ionosphere-free measurements. Additionally, for Option 3, the variance-covariance matrix for the hypothesized threat scenario can be computed such that the ionospheric gradient uncertainties model for the N impacted satellites could be selected to range from the nominal values models to the inflated severe values models, inclusively.

In some embodiments, for Option 3, the measurement model is that the $i^{th}$ threat scenario has had the measurements for its up to N-impacted satellites impacted by ionospheric gradients of a magnitude consistent with the severe threat model and scenario. Therefore, the range of residual measurement distributions uses a biased model. Since the bias for each satellite is the differential ionospheric delay between rover-based and reference platform-based measurements, there are multiple combinations of relative signs that could have impacted the measurement observables consistent with the $i^{th}$ threat scenario. For example, for N=2, for a particular scenario the relative signs for the two ionospheric gradient impacted satellites could be (+,+), (+,-), (-,+), or (-,-), resulting in four sub-scenarios (indexed by j).

Let $DD_{res,i}$ be the set of original unbiased (i.e., not assuming ionospheric gradients) Double-Difference of the measurement observables residual linearized at $x_0$, an initial position estimate (e.g., one can use the main navigation solution or $x_0=x_{H0}$), for the $i^{th}$ threat combination. Let $\delta DD_{iono,i,j}$ be the severe ionospheric gradient model bias double difference for the $i^{th}$ threat scenario and the $i^{th}$ relative sign sub-scenario for the impacted satellites (for example, for N=2, j would range from 1 to 4) consistent with the integrity bounding requirement. This double difference is computed using the modeled signed severe gradient biases for the particular $i^{th}$ threat scenario and the $j^{th}$ bias sign sub-scenario for the impacted satellites and zeros for the nominal satellites. Consequently, the ionospheric gradient adjusted measurement observables residual Double-Difference can be defined as $DD_{res\_iono\_adj,i,j}=DD_{res,i}-\delta DD_{iono,i,j}$, resulting in an observation equation for Option 3 to be defined as $DD_{res\_iono\_adj,i,j}=G*\delta x_{H1,i,j}+\varepsilon_{DD,i}$, where i is the index for the $i^{th}$ threat combination; j is the index for the $j^{th}$ relative sign sub-scenario; G is the observation matrix; $\delta_{H1,i,j}$ is the position correction to be computed; and $\varepsilon_{DD,i}$ is the Double-Difference observable error (note, independent of $j^{th}$ relative sign sub-scenario).

At operation 406, a Weighted-Least Squares (WLS) solution is computed as $\delta_{H1,i,j}=(G^TWG)^{-1}*G^TW*DD_{res\_iono\_adj,i,j}$, where W is the inverse matrix of the variance-covariance matrix of Double-Difference residuals for the hypothesized threat scenario computed such that the ionospheric gradient uncertainties model for the N impacted satellites could be selected to range from the nominal values models to the inflated severe values models, inclusively. Then the $(i,j)^{th}$ H1 navigation solution, $x_{H1,i,j}$, is given by $x_{H1,i,j}=x_0+\delta x_{H1,i,j}$.

At operation 408, the $(i,j)^{th}$ H1 navigation solution PLs is determined as, using VPL as an example, $VPL_{H1\_sol\_i\_j}=k_{iono\_H1}*\sigma_{vert,H1,i,j}$, where the $k_{iono\_H1}$ factor corresponds to Piono_H1_PL_underbound to account for the stochastic probability of under-bounding; and $\sigma_{vert,H1,i,j}$ is the vertical position solution uncertainty for the $(i,j)^{th}$ H1 navigation solution. In some embodiments, differential GPS techniques are used in the WLS computation of vertical position solution uncertainty, which is the square root of a diagonal element of the position solution covariance matrix, i.e., element (3, 3) that corresponds to the vertical position solution uncertainty.

At operation 410, the $(i,j)^{th}$ ionospheric gradient H1 PLs are computed as, again using VPL as an example, $VPL_{H1,i,j}=|(x_{H1,i,j}-x_{H0})_{vert}|+k_{iono\_H1}*\sigma_{vert,H1,i,j}$, where $x_{H1,i,j}$ and $x_{H0}$ are the $(i,j)^{th}$ H1 and main navigation solutions, respectively. The main navigation solution $x_{H0}$ can be computed as in Options 1 and 2.

The maximum can be selected over the j relative sign sub-scenarios for the $i^{th}$ scenario using the $(i,j)^{th}$ ionospheric gradient H1 PLs to obtain the $i^{th}$ ionospheric gradient H1 PLs as again using VPL as an example, $VPL_{H1,i}=\max\{VPL_{H1,i,j}\}$. The maximum of all the $i^{th}$ ionospheric gradient H1 PLs is selected over all hypothesized threat scenarios to obtain the ionospheric gradient H1 PLs as, again using VPL as an example, $$VPL_{H1,iono} = \max_i \{VPL_{H1,i}\}.$$

As clarified herein, when a maximum for a PL is determined, the maximum is independently taken over the types of PLs used for a PL set (i.e., a different i index can be selected for VPL, HPL, LPL when the maximum PL for a PL set is determined).

At operation 412, a maximum PL is selected from the PLs of the H0 navigation solution and the $i^{th}$ H1 PLs as the final PL for the H0 navigation solution. More specifically, the maximum of the ionospheric gradient H0 PLs and the ionospheric gradient H1 PLs is selected as, again using VPL as an example, $VPL_{H0\&H1,iono}=\max(VPL_{H0},VPL_{H1,iono})$.

The resulting PL set protects the main navigation solution $x_{H0}$ against threats under nominal conditions and threats associated with both nominal and severe ionospheric gradients using the ionospherically biased distribution assumption. As in the previous options, to provide full integrity against all threats (nominal or otherwise), the final overall VPL, for example, is the maximum of $VPL_{H0\&H1,iono}$ and the other H1 VPLs, such as H1 receiver and H1 ephemeris VPLs, etc.

For Option 4, the observation equations, i.e., the ranging measurements and differential ranging measurements, the observation matrices, and the variance-covariance matrices (including the safety bounds for the ionospheric gradient uncertainties) are adjusted in a manner consistent with the chosen Option 4 variant for the impacted satellites in a manner consistent with the variant. In particular, the appropriate adjustments described for Options 0, 1, 2, and 3 for a given N for the scenarios, i.e. N=n0+n1+n2+n3 where a scenario specific n0 satellites use Option 0 adjustments, n1 satellites use Option 1 adjustments, n2 satellites use Option 2 adjustments, and n3 satellites use Option 3 adjustments. Therefore, Option 4 variants are specified by their N and {ni}≡{n0, n1, n2, n3} set and their selected parameters (such as those for non-nominal inflation or non-zero bias, if needed). Note that Options 0, 1, 2, and 3 are specific variants of Option 4. The flow of steps for operations for a given variant of Option 4 follow those of Options 1 and 2 in FIG. 3 if n3=0 (i.e., there are no Option 3 bias adjustments) or more generally follow those of Option 3 in FIG. 4 if n3>0 (i.e., if there are Option 3 bias adjustments). Based on Option 4 type computations as described above, more complicated IGH1 Monitor 130 embodiments can be constructed using multiple variant types of Option 4 computations in different logical structures, such as Option 5.

For Option 5, the IGH1 Monitor 130 is configured to perform multiple and different variants of Option 4 computations, in a logical structure with various logic branches, to determine the total ionospheric gradient PL set that protects the main navigation solution $x_{H0}$ against severe ionospheric gradient threats up to the specified integrity risk allocation. The logical structure may be designed for the specific application or selected by the certification agency as meeting the specified integrity risk allocation and could use different N's for different logic branches. For an Option 5 example of a logical structure with two branches, consider the logic Na=n0a+n1a+n2a+n3a with {nia}≡{n0a, n1a, n2a, n3a} AND Nb=n0b+n1b+n2b+n3b with {nib}≡{n0b, n1b, n2b, n3b}, with "Na" not necessarily set equal to "Nb", and {nia} not the same as {nib}, where an {ni}≡{n0, n1, n2, n3} set refers to a specific Option 4 implementation as described earlier. In this case, since both conditions are required to be met, the total ionospheric gradient H1 PL set would be determined by the maximum PL set of the maximum PL sets of each of the two branches for the example. A specific implementation of this example could require Na=2 with {n0a=0, n1a=2, n2a=0, n3a=0} (two Option 1's, unbiased and inflated) AND Nb=2 with {n0b=0, n1b=0, n2b=0, n3b=2} (two Option 3's, biased) with selected non-nominal inflation or non-zero bias Option 4 variations as required to meet integrity. Another specific implementation of this example with different N's could require Na=1 with {n0a=0, n1a=0, n2a=0, n3a=1} (one Option 3, maximally biased) AND Nb-2 {n0b=0, n1b=2, n2b=0, n3b=0} (two Option 1's unbiased and maximally inflated) with selected non-nominal inflation or non-zero bias Option 4 variations as required to meet integrity.

For an Option 5 example using a different logic operator than AND, replace the AND with an OR above. This logic variant allows for logics where, for example, the integrity requirement could be met with either Na=n0a+n1a+n2a+n3a with {nia} OR Nb=n0b+n1b+n2b+n3b with {nib}. In this case, the total ionospheric gradient H1 PL set could be determined by the minimum PL sets of the maximum PL sets of each of the two combinations (i.e., allowing meeting the integrity requirement with either one branch or the other branch, increasing availability). A specific implementation of this example could require Na=2 with {n0a=0, n1a=2, n2a=0, n3a=0} (two Option 1's, unbiased and inflated) OR Nb=2 with {n0b=0, n1b=0, n2b=2, n3b=0} (two Option 2's, ionosphere-free). An Option 5 example of a more complicated logical structure for M=8 could be [Nc=8 with {n0c=0, n1c=0, n2c=0, n3c=8} (all ionosphere-free so only one scenario)] OR [Na=1 with {n0a=0, n1a=0, n2a=0, n3a=1} (one Option 3, maximally biased) AND Nb=2 {n0b=0, n1b=2, n2b=0, n3b=0} (two Option 1's unbiased and maximally inflated)]. For computational efficiency, if the maximum PL set between the first branch of the "OR" and the H0 PL set is sufficient for the desired service, the second branch would not need to be computed.

With these or other Option 5 variants with different or more complicated logical structures, the "final PL set" is determined by taking the maximum of the H0 Pl set (i.e. "main PL set") and total ionospheric gradient H1 PL set, so the "final PL set" cannot be less than the "main PL set". The total ionospheric gradient H1 PL set computations depend on the particular logical structure used. Option 5 is IGH1 Monitor 130 configured to use logical structures selected for the application that use Option 4 variants in its logic branches, each branch variant specified by its N and {ni}≡{n0, n1, n2, n3} set and its selected parameters (such as those for non-nominal inflation or non-zero bias, if needed). Option 5 IGH1 Monitor 130 embodiments can follow more complicated logic flows of steps for operations than those in FIG. 3, FIG. 4, or FIG. 5, but can be straightforwardly generalized from them for a given embodiment.

Figure 5:
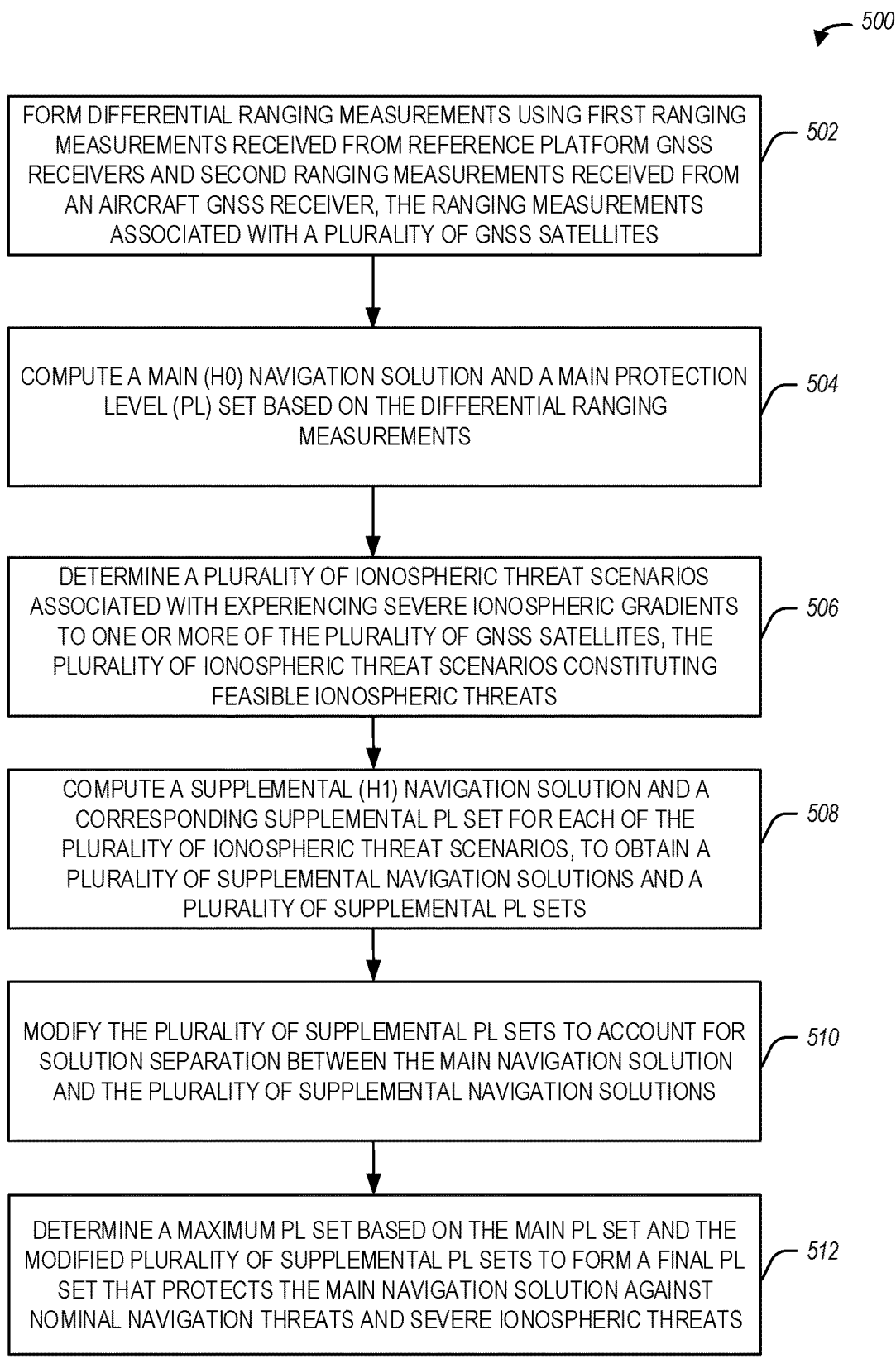
FIG. 5 illustrates a flowchart of a method for monitoring ionospheric gradient threats and bounding navigation solutions over the ionospheric gradient threats, in accordance with some embodiments.

FIG. 5 illustrates a flowchart of a method 500 for monitoring ionospheric gradient threats and bounding navigation solutions over the ionospheric gradient threats, in accordance with some embodiments. The method 500 includes operations 502-512, which may be performed by the IGH1 Monitor 130 (which can be the same as the device 600 of FIG. 6).

In operation 502, first ranging measurements are received from reference Global Navigation Satellite System (GNSS)

receivers and second ranging measurements from one or more GNSS receivers on a rover (e.g., aircraft or ship). Differential ranging measurements are formed based on the first and second ranging measurements. The first and second ranging measurements are associated with (e.g., originating from) a plurality of GNSS satellites. For example, and in reference to FIG. 1, the first ranging measurements can be received by the aircraft 128 from the UDB/VDB station 124, and the second ranging measurements can be received at a GNSS receiver of the aircraft 128 from satellites 102 (e.g., satellites 104, 106, 108, 110, . . . , 112) and which are then sent to be processed by the IGH1 Monitor 130 along with the first ranging measurements.

At operation 504, a main (H0) navigation solution and the main protection level (PL) set are computed based on the differential ranging measurements. In some embodiments, the main navigation solution ($x_{H0}$) and the main protection level set may have already been calculated prior to IGH1 monitoring, under such a condition, they could simply be used as inputs for the IGH1 calculation as opposed to recalculating them.

At operation 506, a plurality of ionospheric threat scenarios associated with experiencing severe ionospheric gradients to one or more of the plurality of GNSS satellites is determined. The plurality of ionospheric threat scenarios may constitute feasible ionospheric threats. For example, and as discussed in connection with FIG. 3 and FIG. 4 above, N out of a total of M satellites can be considered to be impacted by the ionospheric gradient front 140 and corresponding threat scenarios can be computed based on such assumption.

At operation 508, a supplemental (H1) navigation solution and a corresponding supplemental PL set are computed for each of the plurality of ionospheric threat scenarios, to obtain a plurality of supplemental navigation solutions and a plurality of supplemental PL sets (e.g., as discussed in connection with Options 1-3 and FIGS. 4-5).

At operation 510, the plurality of supplemental PL sets is modified to account for solution separation between the main navigation solution ($x_{H0}$) and the plurality of supplemental navigation solutions. At operation 512, a maximum PL set is determined based on the main PL set and the modified plurality of supplemental PL sets to form a final PL set that protects the main navigation solution against nominal navigation threats and severe ionospheric threats.

Figure 6:
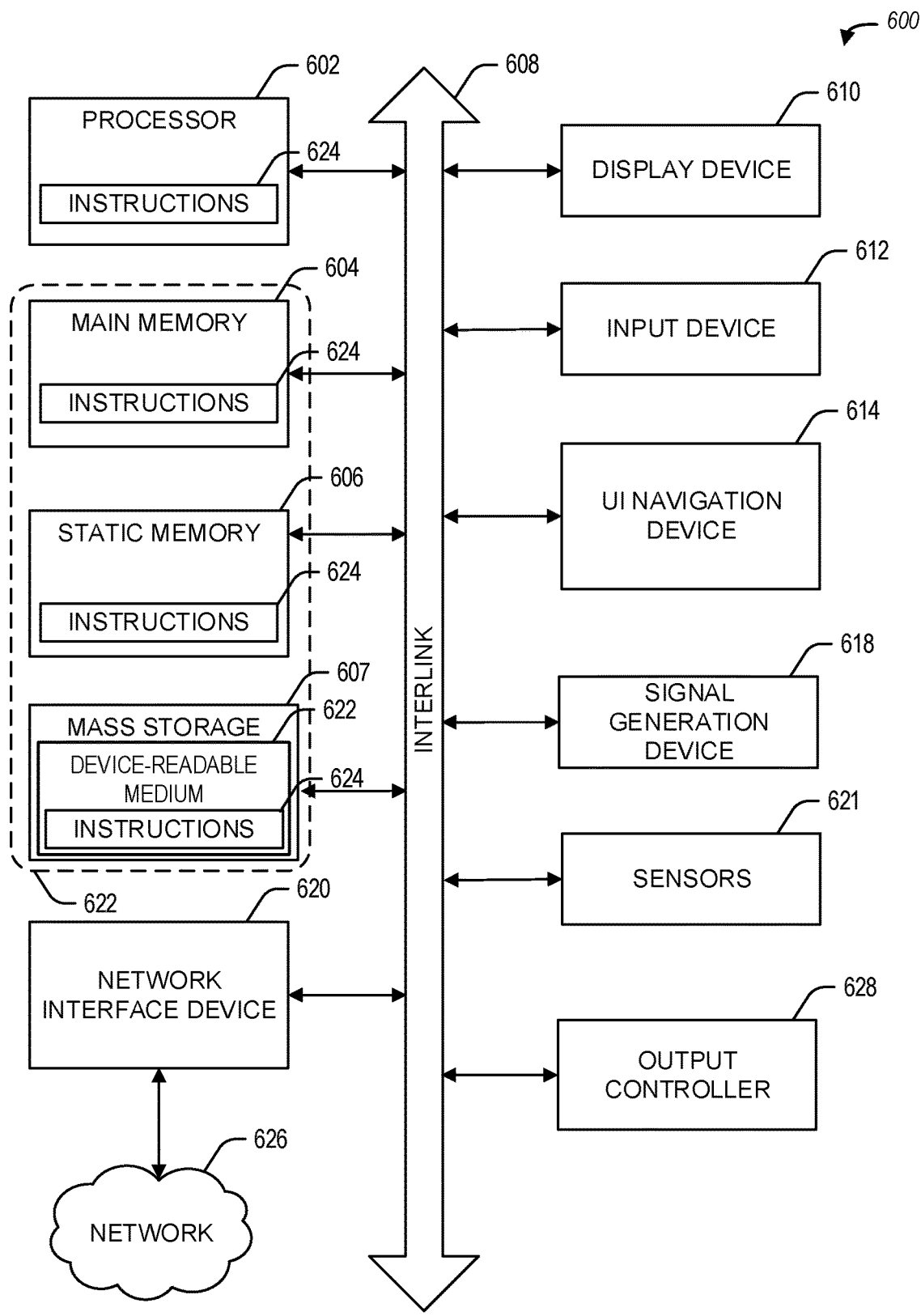
FIG. 6 illustrates a block diagram of an example machine upon which any one or more of the techniques (e.g., methodologies) discussed herein may be performed.

FIG. 6 illustrates a block diagram of an example machine 600 upon which any one or more of the techniques (e.g., methodologies) discussed herein may be performed. In alternative embodiments, the machine 600 may operate as a standalone device (e.g., as an Ionospheric Gradient H1 Monitor, such as IGH1 Monitor 130, performing one or more of the functionalities discussed herein) or may be connected (e.g., networked) to other machines. In a networked deployment, the machine 600 may operate in the capacity of a server machine, a client machine, or both in server-client network environments. In an example, the machine 600 may act as a peer machine in peer-to-peer (P2P) (or other distributed) network environment. The machine 600 may be a server, personal computer (PC), a tablet PC, a set-top box (STB), a personal digital assistant (PDA), a portable communications device, AR hardware, a mobile telephone, a smartphone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Circuitry (e.g., processing circuitry) is a collection of circuits implemented in tangible entities of the machine 600 that include hardware (e.g., simple circuits, gates, logic, etc.). Circuitry membership may be flexible over time. Circuitries include members that may, alone or in combination, perform specified operations when operating. In an example, the hardware of the circuitry may be immutably designed to carry out a specific operation (e.g., hardwired). In an example, the hardware of the circuitry may include variably connected physical components (e.g., execution units, transistors, simple circuits, etc.) including a machine-readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuitry in hardware via the variable connections to carry out portions of the specific operation when in operation. Accordingly, in an example, the machine-readable medium elements are part of the circuitry or are communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry at a different time. Additional examples of these components with respect to the device 600 follow.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a communication device-readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using the software, the general-purpose hardware processor may be configured as respective different modules at different times. The software may accordingly configure a hardware processor, for example, to constitute a particular module at one instance of time and to constitute a different module at a different instance of time.

Machine 600 may include a hardware processor 602 (e.g., a central processing unit (CPU), a graphics processing unit (GPU), a hardware processor core, or any combination thereof), a main memory 604, a static memory 606, and mass storage 606 (e.g., hard drive, tape drive, flash storage, or other block or storage devices), some or all of which may communicate with each other via an interlink (e.g., bus) 608.

Machine 600 may further include a display device 610, an alphanumeric input device 612 (e.g., a keyboard), and a user interface (UI) navigation device 614 (e.g., a mouse). In an example, the display device 610, input device 612 and UI navigation device 614 may be a touchscreen display. Machine 600 may additionally include a signal generation device 618 (e.g., a speaker), a network interface device 620, and one or more sensors 621, such as a global positioning system (GPS) (or another type of geo-spatial positioning) sensor, compass, accelerometer, or another sensor. Machine 600 may include an output controller 628, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The mass storage 607 may include a communication device-readable medium 622, on which is stored one or more sets of data structures or instructions 624 (e.g., software) embodying or utilized by any one or more of the techniques or functions described herein. In some aspects, registers of the processor 602, the main memory 604, the static memory 606, and/or the mass storage 607 may be, or include (completely or at least partially), the device-readable medium 622, on which is stored the one or more sets of data structures or instructions 624, embodying or utilized by any one or more of the techniques or functions described herein. In an example, one or any combination of the hardware processor 602, the main memory 604, the static memory 606, or the mass storage 607 may constitute the device-readable medium 622.

As used herein, the term "device-readable medium" is interchangeable with "computer-readable medium" or "machine-readable medium". While the communication device-readable medium 622 is illustrated as a single medium, the term "communication device-readable medium" may include a single medium or multiple media (e.g., a centralized or distributed database, and/or associated caches and servers) configured to store the one or more instructions 624. The term "communication device-readable medium" is inclusive of the terms "machine-readable medium" or "computer-readable medium", and may include any medium that is capable of storing, encoding, or carrying instructions (e.g., instructions 624) for execution by the machine 600 and that cause the machine 600 to perform any one or more of the techniques of the present disclosure, or that is capable of storing, encoding or carrying data structures used by or associated with such instructions. Non-limiting communication device-readable medium examples may include solid-state memories and optical and magnetic media. Specific examples of communication device-readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, communication device-readable media may include non-transitory communication device-readable media. In some examples, communication device-readable media may include communication device-readable media that is not a transitory propagating signal.

The instructions 624 may further be transmitted or received over a communications network 626 using a transmission medium via the network interface device 620 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, Licensed Assisted Access (LAA), IEEE 802.15.4 family of standards, a Long Term Evolution (LTE) family of standards, a Universal Mobile Telecommunications System (UMTS) family of standards, peer-to-peer (P2P) networks, among others.

In an example, the network interface device 620 may include one or more physical jacks (e.g., Ethernet, coaxial, or phone jacks) or one or more antennas to connect to the communications network 626. In an example, the network interface device 620 may include a plurality of antennas to wirelessly communicate using at least one of single-input-multiple-output (SIMO), MIMO, or multiple-input-single-output (MISO) techniques. In some examples, the network interface device 620 may wirelessly communicate using Multiple User MIMO techniques.

The term "transmission medium" shall be taken to include any intangible medium that is capable of storing, encoding or carrying instructions for execution by the machine 600, and includes digital or analog communications signals or another intangible medium to facilitate communication of such software. In this regard, a transmission medium in the context of this disclosure is a device-readable medium.

It should be appreciated that where software is described in a particular form (such as a component or module) this is merely to aid understanding and is not intended to limit how software that implements those functions may be architected or structured. For example, modules are illustrated as separate modules but may be implemented as homogenous code, as individual components, some, but not all of these modules may be combined, or the functions may be implemented in software structured in any other convenient manner. Furthermore, although the software modules are illustrated as executing on one piece of hardware, the software may be distributed over multiple processors or in any other convenient manner.

Additional examples and embodiments are discussed herein below.

Example 1 is a computer-implemented method, the method comprising: receiving first ranging measurements from reference Global Navigation Satellite System (GNSS) receivers and second ranging measurements from one or more GNSS receivers on a rover, the first and second ranging measurements associated with a plurality of GNSS satellites from one or a plurality of GNSS constellations; forming differential ranging measurements using the first and second ranging measurements; computing a main (H0) navigation solution and a main protection level (PL) set based on the differential ranging measurements; determining a plurality of ionospheric threat scenarios associated with experiencing severe ionospheric gradients to one or more of the plurality of GNSS satellites, the plurality of ionospheric threat scenarios constituting feasible ionospheric threats; computing a supplemental (H1) navigation solution and a corresponding supplemental PL set for each of the plurality of ionospheric threat scenarios, to obtain a plurality of supplemental navigation solutions and a plurality of supplemental PL sets; modifying the plurality of supplemental PL sets to account for solution separation between the main navigation solution and the plurality of supplemental navigation solutions; and determining a maximum PL set based on the main PL set and the modified plurality of supplemental PL sets to form a final PL set that protects the main navigation solution against nominal navigation threats and severe ionospheric threats.

In Example 2, the subject matter of Example 1 includes, wherein the plurality of GNSS satellites includes a total of M satellites, and the method comprises: determining the plurality of ionospheric threat scenarios when N satellites out of the M satellites are impacted by the severe ionospheric gradients, where N and M are positive integers, $N \leq M$, and $N \geq 1$.

In Example 3, the subject matter of Example 2 includes, wherein at least one of the plurality of ionospheric threat scenarios is associated with the N satellites out of the M satellites impacted by the severe ionospheric gradients, and (M−N) satellites out of the M satellites experiencing nominal ionospheric gradients, where for example N=2.

In Example 4, the subject matter of Examples 2-3 includes, wherein computing the plurality of supplemental navigation solutions comprises: computing the supplemental navigation solution for each of the plurality of ionospheric threat scenarios using a subset of the differential ranging measurements, the subset excluding differential ranging measurements of the N satellites that are impacted by the severe ionospheric gradients.

In Example 5, the subject matter of Examples 2-4 includes, wherein computing the plurality of supplemental navigation solutions comprises: increasing an ionospheric gradient uncertainty level for a subset of the differential ranging measurements associated with the N satellites that are impacted by the severe ionospheric gradients, to safely bound a differential ranging measurement error due to the severe ionospheric gradients; and computing the supplemental navigation solution for each of the plurality of ionospheric threat scenarios using nominal ionospheric gradient uncertainty level for unimpacted differential ranging measurements and the increased ionospheric gradient uncertainty level for the impacted differential ranging measurements.

In Example 6, the subject matter of Examples 2-5 includes, wherein computing the plurality of supplemental navigation solutions comprises: replacing a subset of the differential ranging measurements associated with the N satellites that are impacted by the severe ionospheric gradients with ionosphere-free differential ranging measurements; and computing the supplemental navigation solution for each of the plurality of ionospheric threat scenarios using divergence-free differential ranging measurements from (M−N) unimpacted satellites and the ionosphere-free differential ranging measurements from the N impacted satellites. As used herein, the term "ionosphere-free differential ranging measurement" is a differential ranging measurement (such as a Single Difference or Double Difference) which is computed using at least one or possibly more ionosphere-free ranging measurements for the participating measurements in the differential ranging measurement (e.g. for the possible 1 or 2 impacted satellites in an N=2 of M=8 Double Difference measurement combination, rover and reference, i.e., one satellite from the N impacted using ionosphere-free ranging and one from the (M−N) unimpacted using divergence-free ranging, or both satellites from the N impacted using ionosphere-free ranging, respectively). If all of the ranging measurements for all of the satellites, rover and reference, are selected as ionosphere-free measurements, i.e. if N=M is used, this example case reduces to the "first approach" discussed earlier using all ionosphere-free ranging measurements. The term "divergence-free differential ranging measurement" on the other hand refers to a differential ranging measurement computed using only divergence-free ranging measurements and no ionosphere-free ranging measurements (e.g., for the possible 0 impacted satellites in an N=2 of M=8 Double Difference measurement combination, rover and reference, i.e. both satellites from the (M−N) unimpacted using divergence-free ranging).

In Example 7, the subject matter of Examples 2-6 includes, wherein computing the plurality of supplemental navigation solutions comprises: computing the supplemental navigation solution and the corresponding supplemental PL set for each of the plurality of ionospheric threat scenarios using the differential ranging measurements, wherein computing the corresponding supplemental PL set for each of the plurality of ionospheric threat scenarios includes accounting for bias in the differential ranging measurements for each of the N impacted satellites.

In Example 8, the subject matter of Examples 1-7 includes, wherein computing the main navigation solution and the main PL set uses a nominal ionospheric gradient uncertainty level to bound ionospheric errors in the differential ranging measurements.

In Example 9, the subject matter of Examples 1-8 includes, wherein the main navigation solution can be computed as a float solution, a carrier-smoothed-code solution, or a high integrity Real-Time Kinematic (RTK) solution.

In Example 10, the subject matter of Examples 1-9 includes, wherein the main PL set includes at least one of the following: a main vertical protection level (VPL), a main lateral protection level (LPL), or a horizontal protection level (HPL).

In Example 11, the subject matter of Examples 2-10 includes, wherein computing the plurality of supplemental navigation solutions comprises: for each of N impacted satellites, performing one or more of the following: excluding the corresponding differential measurements, increasing integrity bounds, replacing with the corresponding ionosphere-free differential ranging measurements, or accounting for bias in differential ranging measurements; and computing the supplemental navigation solution for each of the plurality of ionospheric threat scenarios using divergence-free differential ranging measurements from (M−N) unimpacted satellites and the above-obtained differential ranging measurements and/or bounds from the N impacted satellites.

In Example 12, the subject matter of Examples 2-11 includes, wherein computing the plurality of supplemental navigation solutions comprises: computing the supplemental navigation solution and the corresponding supplemental PL set for each of the plurality of ionospheric threat scenarios by selecting an optimal processing option from techniques provided by Examples 4-7 and 11, based on an approaching aircraft's position relative to locations of the reference GNSS receivers.

In Example 13, the subject matter of Examples 4-12 includes, wherein computing the plurality of supplemental navigation solutions comprises: computing the supplemental navigation solution and the corresponding supplemental PL set for each of the plurality of ionospheric threat scenarios as a float or carrier-smoothed-code solution.

In Example 14, the subject matter of Examples 1-13 includes, receiving the main (H0) navigation solution and the main PL set as input from the navigation system.

Example 15 is a computing device, the computing device comprising: a processor; and a memory, comprising instructions, which when executed by the processor, cause the processor to perform operations comprising: receiving first ranging measurements from reference Global Navigation Satellite System (GNSS) receivers and second ranging measurements from one or more GNSS receivers on a rover, the first and second ranging measurements associated with a plurality of GNSS satellites; forming differential ranging measurements using the first and second ranging measurements; computing a main (H0) navigation solution and a main protection level (PL) set based on the differential ranging measurements; determining a plurality of ionospheric threat scenarios associated with experiencing severe ionospheric gradients to one or more of the plurality of GNSS satellites, the plurality of ionospheric threat scenarios constituting feasible ionospheric threats; computing a supplemental (H1) navigation solution and a corresponding supplemental PL set for each of the plurality of ionospheric threat scenarios, to obtain a plurality of supplemental navigation solutions and a plurality of supplemental PL sets; modifying the plurality of supplemental PL sets to account for solution separation between the main navigation solution and the plurality of supplemental navigation solutions; and determining a maximum PL set based on the main PL set and the modified plurality of supplemental PL sets to form a final PL set that protects the main navigation solution against nominal navigation threats and severe ionospheric threats.

In Example 16, the subject matter of Example 15 includes, wherein the plurality of GNSS satellites includes a total of M satellites, and the processor further performs operations comprising: determining the plurality of ionospheric threat scenarios when N satellites out of the M satellites are impacted by the severe ionospheric gradients, where N and M are positive integers, $N \leq M$, and $N \geq 1$.

In Example 17, the subject matter of Example 16 includes, wherein at least one of the plurality of ionospheric threat scenarios is associated with the N satellites out of the M satellites impacted by the severe ionospheric gradients, and (M−N) satellites out of the M satellites experiencing nominal ionospheric gradients, where for example N=2.

In Example 18, the subject matter of Examples 16-17 includes, wherein computing the plurality of supplemental navigation solutions comprises: computing the supplemental navigation solution for each of the plurality of ionospheric threat scenarios using a subset of the differential ranging measurements, the subset excluding differential ranging measurements of the N satellites that are impacted by the severe ionospheric gradients.

In Example 19, the subject matter of Examples 16-18 includes, wherein to compute the plurality of supplemental navigation solutions, the processor further performs operations comprising: increasing an ionospheric gradient uncertainty level for a subset of the differential ranging measurements associated with the N satellites that are impacted by the severe ionospheric gradients, to safely bound a differential ranging measurement error due to the severe ionospheric gradients; and computing the supplemental navigation solution for each of the plurality of ionospheric threat scenarios using the increased ionospheric gradient uncertainty level for the differential ranging measurements.

In Example 20, the subject matter of Examples 16-19 includes, wherein to compute the plurality of supplemental navigation solutions, the processor further performs operations comprising: replacing a subset of the differential ranging measurements associated with the N satellites that are impacted by the severe ionospheric gradients with ionosphere-free differential ranging measurements; and computing the supplemental navigation solution for each of the plurality of ionospheric threat scenarios using divergence-free differential ranging measurements of the differential ranging measurements from (M−N) satellites that are unimpacted and the ionosphere-free differential ranging measurements from the N impacted satellites.

In Example 21, the subject matter of Examples 16-20 includes, wherein to compute the plurality of supplemental navigation solutions, the processor further performs operations comprising: computing the supplemental navigation solution and the corresponding supplemental PL set for each of the plurality of ionospheric threat scenarios using the differential ranging measurements, wherein computing the corresponding supplemental PL set for each of the plurality of ionospheric threat scenarios includes accounting for bias in the differential ranging measurements for each of the N impacted satellites.

In Example 22, the subject matter of Examples 15-21 includes, wherein computing the main navigation solution and the main PL set uses a nominal ionospheric gradient uncertainty level to bound ionospheric errors in the differential ranging measurements.

Example 23 is a non-transitory computer-readable storage medium that stores instructions for execution by one or more processors of a computing device, the instructions to configure the one or more processors to: receive first ranging measurements from reference Global Navigation Satellite System (GNSS) receivers and second ranging measurements from one or more GNSS receivers on a rover, the first and second ranging measurements associated with a plurality of GNSS satellites; form differential ranging measurements using the first and second ranging measurements; compute a main (H0) navigation solution and a main protection level (PL) set based on the differential ranging measurements; determine a plurality of ionospheric threat scenarios associated with experiencing severe ionospheric gradients to one or more of the plurality of GNSS satellites, the plurality of ionospheric threat scenarios constituting feasible ionospheric threats; compute a supplemental (H1) navigation solution and a corresponding supplemental PL set for each of the plurality of ionospheric threat scenarios, to obtain a plurality of supplemental navigation solutions and a plurality of supplemental PL sets; modify the plurality of supplemental PL sets to account for solution separation between the main navigation solution and the plurality of supplemental navigation solutions; and determine a maximum PL set based on the main PL set and the modified plurality of supplemental PL sets to form a final PL set that protects the main navigation solution against nominal navigation threats and severe ionospheric threats.

In Example 24, the subject matter of Example 23 includes, wherein the plurality of GNSS satellites includes a total of M satellites, and wherein the instructions further configure the one or more processors to: determine the plurality of ionospheric threat scenarios when N satellites out of the M satellites are impacted by the severe ionospheric gradients, where N and M are positive integers, $N \leq M$, and $N \geq 1$.

Example 25 is at least one machine-readable medium including instructions that, when executed by processing circuitry, cause the processing circuitry to perform operations to implement of any of Examples 1-24.

Example 26 is an apparatus comprising means to implement of any of Examples 1-24.

Example 27 is a system to implement of any of Examples 1-24.

Example 28 is a method to implement of any of Examples 1-24.

Although embodiments have been described with reference to specific exemplary aspects, it will be evident that various modifications and changes may be made to these aspects without departing from the broader scope of the present disclosure. Accordingly, the specification and drawings are to be regarded in an illustrative rather than a restrictive sense. The accompanying drawings that form a part hereof show, by way of illustration, and not of limitation, specific aspects in which the subject matter may be practiced. The aspects illustrated are described in sufficient detail to enable those skilled in the art to practice the teachings disclosed herein. Other aspects may be utilized and derived therefrom, such that structural and logical substitutions and changes may be made without departing from the scope of this disclosure. This Detailed Description, therefore, is not to be taken in a limiting sense, and the scope of various aspects is defined only by the appended claims, along with the full range of equivalents to which such claims are entitled.

Such aspects of the inventive subject matter may be referred to herein, individually or collectively, merely for convenience and without intending to voluntarily limit the scope of this application to any single aspect or inventive concept if more than one is in fact disclosed. Thus, although specific aspects have been illustrated and described herein, it should be appreciated that any arrangement calculated to achieve the same purpose may be substituted for the specific aspects shown. This disclosure is intended to cover any and all adaptations or variations of various aspects. Combinations of the above aspects and other aspects not specifically described herein will be apparent to those of skill in the art upon reviewing the above description.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single aspect for the purpose of streamlining the disclosure. This method of disclosure is not to be interpreted as reflecting an intention that the claimed aspects require more features than are expressly recited in each claim. Rather, as the following claims reflect, the inventive subject matter lies in less than all features of a single disclosed aspect. Thus the following claims are hereby incorporated into the Detailed Description, with each claim standing on its own as a separate aspect.

What is claimed is:

1. A computer-implemented method, the method comprising:
    receiving first ranging measurements from reference Global Navigation Satellite System (GNSS) receivers and second ranging measurements from one or more GNSS receivers on a rover, the first and second ranging measurements associated with a plurality of GNSS satellites from one or a plurality of GNSS constellations;
    computing a main (H0) navigation solution and a main protection level (PL) set based on the first and second ranging measurements;
    determining a plurality of ionospheric threat scenarios associated with experiencing severe ionospheric gradients to one or more of the plurality of GNSS satellites, the plurality of ionospheric threat scenarios constituting feasible ionospheric threats, wherein the severe ionospheric gradients comprise non-nominal ionospheric conditions under which nominal ionospheric delay uncertainties cannot properly bound error in estimating ionospheric delays, and wherein the feasible ionospheric threats comprise a physically feasible severe ionospheric threat that can happen with a non-negligible probability for high integrity GNSS navigation;
    computing a supplemental (H1) navigation solution and a corresponding supplemental PL set for each of the plurality of ionospheric threat scenarios, to obtain a plurality of supplemental navigation solutions and a plurality of supplemental PL sets;
    determining a maximum PL set based on the main PL set and the plurality of supplemental PL sets to form a final PL set;
    protecting the main navigation solution against navigation threats and ionospheric threats using the final PL set; and
    transmitting the final PL set to the one or more GNSS receivers on a rover to protect the rover from ionospheric threats during a landing operation;
    wherein the plurality of GNSS satellites includes a total of M satellites, and the method comprises:
    computing the main navigation solution and the main PL set based on differential ranging measurements formed using the first and second ranging measurements;
    determining the plurality of ionospheric threat scenarios when N satellites out of the M satellites are impacted by the severe ionospheric gradients, where N and M are positive integers, N≤M, and N≥1; and
    modifying the plurality of supplemental PL sets via a carrier-smoothed code solution or a high integrity RTK solution to account for solution separation between the main navigation solution and the plurality of supplemental navigation solutions, wherein the maximum PL set is determined based on the main PL set and the modified plurality of supplemental PL sets: wherein the solution separation comprises a 3D positional separation between the main navigation solution and the plurality of supplemental navigation solutions.

2. The computer-implemented method of claim 1, wherein at least one of the plurality of ionospheric threat scenarios is associated with the N satellites out of the M satellites impacted by the severe ionospheric gradients, and (M−N) satellites out of the M satellites experiencing non-severe ionospheric gradients.

3. The computer-implemented method of claim 1, wherein computing the plurality of supplemental navigation solutions comprises:
    computing the supplemental navigation solution for each of the plurality of ionospheric threat scenarios using a subset of the differential ranging measurements, the subset excluding differential ranging measurements of the N satellites that are impacted by the severe ionospheric gradients.

4. The computer-implemented method of claim 1, wherein computing the plurality of supplemental navigation solutions comprises:
increasing an ionospheric gradient uncertainty level for a subset of the differential ranging measurements associated with the N satellites that are impacted by the severe ionospheric gradients, to safely bound a differential ranging measurement error due to the severe ionospheric gradients; and
computing the supplemental navigation solution for each of the plurality of ionospheric threat scenarios using ionospheric gradient uncertainty level for unimpacted differential ranging measurements and the increased ionospheric gradient uncertainty level for the impacted differential ranging measurements.

5. The computer-implemented method of claim 1, wherein computing the plurality of supplemental navigation solutions comprises:
replacing a subset of the differential ranging measurements associated with the N satellites that are impacted by the severe ionospheric gradients with ionosphere-free differential ranging measurements in which an ionospheric delay effect is removed; and
computing the supplemental navigation solution for each of the plurality of ionospheric threat scenarios using divergence-free differential ranging measurements from (M−N) unimpacted satellites and the ionosphere-free differential ranging measurements from the N impacted satellites.

6. The computer-implemented method of claim 1, wherein computing the plurality of supplemental navigation solutions comprises:
computing the supplemental navigation solution and the corresponding supplemental PL set for each of the plurality of ionospheric threat scenarios using the differential ranging measurements, wherein computing the corresponding supplemental PL set for each of the plurality of ionospheric threat scenarios includes accounting for bias in the differential ranging measurements for each of the N impacted satellites.

7. The computer-implemented method of claim 1, wherein computing the main navigation solution and the main PL set uses an ionospheric gradient uncertainty level to bound ionospheric errors in the differential ranging measurements.

8. The computer-implemented method of claim 1, wherein the main navigation solution is computed as a float solution, a carrier-smoothed-code solution, or a high integrity Real-Time Kinematic (RTK) solution.

9. The computer-implemented method of claim 1, wherein the main PL set includes at least one of the following:
a main vertical protection level (VPL), a main lateral protection level (LPL), or a horizontal protection level (HPL).

10. A computing device, the computing device comprising:
a processor; and
a memory, comprising instructions, which when executed by the processor, cause the processor to perform operations comprising:
receiving first ranging measurements from reference Global Navigation Satellite System (GNSS) receivers and second ranging measurements from one or more GNSS receivers on a rover, the first and second ranging measurements associated with a plurality of GNSS satellites from one or a plurality of GNSS constellations;
computing a main (H0) navigation solution and a main protection level (PL) set based on the first and second ranging measurements;
determining a plurality of ionospheric threat scenarios associated with experiencing severe ionospheric gradients to one or more of the plurality of GNSS satellites, the plurality of ionospheric threat scenarios constituting feasible ionospheric threats, wherein the severe ionospheric gradients comprise non-nominal ionospheric conditions under which nominal ionospheric delay uncertainties cannot properly bound error in estimating ionospheric delays, and wherein the feasible ionospheric threats comprise a physically feasible severe ionospheric threat that can happen with a non-negligible probability for high integrity GNSS navigation;
computing a supplemental (H1) navigation solution and a corresponding supplemental PL set for each of the plurality of ionospheric threat scenarios, to obtain a plurality of supplemental navigation solutions and a plurality of supplemental PL sets;
determining a maximum PL set based on the main PL set and the plurality of supplemental PL sets to form a final PL set;
protecting the main navigation solution against navigation threats and ionospheric threats using the final PL set; and
transmitting the final PL set to the one or more GNSS receivers on a rover to protect the rover from ionospheric threats during a landing operation;
wherein the plurality of GNSS satellites includes a total of M satellites, and the method comprises:
computing the main navigation solution and the main PL set based on differential ranging measurements formed using the first and second ranging measurements;
determining the plurality of ionospheric threat scenarios when N satellites out of the M satellites are impacted by the first ionospheric gradients, where N and M are positive integers, N≤M, and N≥1; and
modifying the plurality of supplemental PL sets via a carrier-smoothed code solution or a high integrity RTK solution to account for solution separation between the main navigation solution and the plurality of supplemental navigation solutions, wherein the maximum PL set is determined based on the main PL set and the modified plurality of supplemental PL sets: wherein the solution separation comprises a 3D positional separation between the main navigation solution and the plurality of supplemental navigation solutions.

11. The computing device of claim 10, wherein at least one of the plurality of ionospheric threat scenarios is associated with the N satellites out of the M satellites impacted by the severe ionospheric gradients, and (M−N) satellites out of the M satellites experiencing non-severe ionospheric gradients.

12. The computing device of claim 10, wherein computing the plurality of supplemental navigation solutions comprises:
computing the supplemental navigation solution for each of the plurality of ionospheric threat scenarios using a subset of the differential ranging measurements, the subset excluding differential ranging measurements of the N satellites that are impacted by the severe ionospheric gradients.

13. The computing device of claim 10, wherein to compute the plurality of supplemental navigation solutions, the processor further performs operations comprising:

increasing an ionospheric gradient uncertainty level for a subset of the differential ranging measurements associated with the N satellites that are impacted by the severe ionospheric gradients, to safely bound a differential ranging measurement error due to the severe ionospheric gradients; and computing the supplemental navigation solution for each of the plurality of ionospheric threat scenarios using ionospheric gradient uncertainty level for unimpacted differential ranging measurements and the increased ionospheric gradient uncertainty level for the impacted differential ranging measurements.

14. The computing device of claim 10, wherein to compute the plurality of supplemental navigation solutions, the processor further performs operations comprising:

replacing a subset of the differential ranging measurements associated with the N satellites that are impacted by the severe ionospheric gradients with ionosphere-free differential ranging measurements in which an ionospheric delay effect is removed; and computing the supplemental navigation solution for each of the plurality of ionospheric threat scenarios using divergence-free differential ranging measurements from (M−N) unimpacted satellites and the ionosphere-free differential ranging measurements from the N impacted satellites.

15. The computing device of claim 10, wherein to compute the plurality of supplemental navigation solutions, the processor further performs operations comprising:

computing the supplemental navigation solution and the corresponding supplemental PL set for each of the plurality of ionospheric threat scenarios using the differential ranging measurements, wherein computing the corresponding supplemental PL set for each of the plurality of ionospheric threat scenarios includes accounting for bias in the differential ranging measurements for each of the N impacted satellites.

16. The computing device of claim 10, wherein computing the main navigation solution and the main PL set uses an ionospheric gradient uncertainty level to bound ionospheric errors in the differential ranging measurements.

17. A non-transitory computer-readable storage medium that stores instructions for execution by one or more processors of a computing device, the instructions to configure the one or more processors to:

receive first ranging measurements from reference Global Navigation Satellite System (GNSS) receivers and second ranging measurements from one or more GNSS receivers on a rover, the first and second ranging measurements associated with a plurality of GNSS satellites from one or a plurality of GNSS constellations;

compute a main (H0) navigation solution and a main protection level (PL) set based on the first and second ranging measurements;

determine a plurality of ionospheric threat scenarios associated with experiencing severe ionospheric gradients to one or more of the plurality of GNSS satellites, the plurality of ionospheric threat scenarios constituting feasible ionospheric threats, wherein the severe ionospheric gradients comprise non-nominal ionospheric conditions under which nominal ionospheric delay uncertainties cannot properly bound error in estimating ionospheric delays, and wherein the feasible ionospheric threats comprise a physically feasible severe ionospheric threat that can happen with a non-negligible probability for high integrity GNSS navigation;

compute a supplemental (H1) navigation solution and a corresponding supplemental PL set for each of the plurality of ionospheric threat scenarios, to obtain a plurality of supplemental navigation solutions and a plurality of supplemental PL sets;

determine a maximum PL set based on the main PL set and the plurality of supplemental PL sets to form a final PL set;

protect the main navigation solution against navigation threats and ionospheric threats using the final PL set; and transmit the final PL set to the one or more GNSS receivers on a rover to protect the rover from ionospheric threats during a landing operation;

wherein the plurality of GNSS satellites includes a total of M satellites, and wherein the instructions further configure the one or more processors to:

compute the main navigation solution and the main PL set based on differential ranging measurements formed using the first and second ranging measurements;

determine the plurality of ionospheric threat scenarios when N satellites out of the M satellites are impacted by first severe ionospheric gradients, where N and M are positive integers, N≤M, and N≥1; and modify the plurality of supplemental PL sets via a carrier-smoothed code solution or a high integrity RTK solution to account for solution separation between the main navigation solution and the plurality of supplemental navigation solutions, wherein the maximum PL set is determined based on the main PL set and the modified plurality of supplemental PL sets: wherein the solution separation comprises a 3D positional separation between the main navigation solution and the plurality of supplemental navigation solutions.

* * * * *